US012680344B2

(12) United States Patent
Litwinski

(10) Patent No.: US 12,680,344 B2
(45) Date of Patent: Jul. 14, 2026

(54) DRIVING DEVICE, IN PARTICULAR FOR CONTROLLING A LOCK EQUIPPED WITH A CYLINDER INSERT, A ROTARY HOUSING OF A DRIVING DEVICE, AND A TOOTHED RING OF A DRIVING DEVICE

(71) Applicant: TEDEE IP SPOLKA Z OGRANICZONA ODPOWIEDZIALNOSCIA, Warsaw (PL)

(72) Inventor: Artur Litwinski, Warsaw (PL)

(73) Assignee: TEDEE IP SPOLKAZ OGRANICZONA ODPOWIEDZIALNOSCIA, Warsaw (PL)

(*) Notice: Subject to any disclaimer, the term of this patent is extended or adjusted under 35 U.S.C. 154(b) by 24 days.

(21) Appl. No.: 18/847,527

(22) PCT Filed: Mar. 16, 2023

(86) PCT No.: PCT/IB2023/052577
§ 371 (c)(1),
(2) Date: Sep. 16, 2024

(87) PCT Pub. No.: WO2023/175555
PCT Pub. Date: Sep. 21, 2023

(65) Prior Publication Data

US 2025/0207433 A1 Jun. 26, 2025

(30) Foreign Application Priority Data

Mar. 17, 2022 (PL) ........................................ 440684
Mar. 17, 2022 (PL) ........................................ 440685

(51) Int. Cl.
*E05B 47/00* (2006.01)

(52) U.S. Cl.
CPC .... *E05B 47/0012* (2013.01); *E05B 2047/002* (2013.01); *E05B 2047/0058* (2013.01);
(Continued)

(58) Field of Classification Search
CPC ........... E05B 47/0012; E05B 2047/002; E05B 2047/0058; E05B 2047/0083; E05B 2047/0091
(Continued)

(56) References Cited

U.S. PATENT DOCUMENTS 5,474,348 A * 12/1995 Palmer ................ E05B 47/0669
292/144
11,578,505 B2 2/2023 Litwinski
(Continued)

FOREIGN PATENT DOCUMENTS

CN 107355137 11/2017
CN 107355137 A * 11/2017 ......... E05B 47/0001
(Continued)

OTHER PUBLICATIONS

PCT/IB2023/052577 International Search Report dated Jul. 5, 2023.

*Primary Examiner* — Nathan Cumar
(74) *Attorney, Agent, or Firm* — Ralph E. Jocke; WALKER & JOCKE

(57) ABSTRACT

A key turning device (1) is releasably engageable with a key (15) that is in engagement with the key cylinder (8) of a lock body (6). The device includes a mount ring (5) with a central opening (7) through which of the key extends, and an internal gear ring (9). A housing (3) is movably mounted in operative engagement with the mount ring such that the housing is rotatably movable and axially immovable relative to the mount ring. The housing includes at least one electric cell (34), a motor (32) and a transmission (33) which includes with an output gear (4). The housing further
(Continued)

includes a key pocket (11) that holds a head of the key. The device is selective operative to rotate the housing relative to the mount ring such that the key rotates the key cylinder to change the lock between locked and unlocked conditions.

25 Claims, 15 Drawing Sheets

(52) U.S. Cl.
CPC ................ *E05B 2047/0083* (2013.01); *E05B 2047/0091* (2013.01)

(58) Field of Classification Search
USPC ........................................................ 70/277
See application file for complete search history.

(56) References Cited

U.S. PATENT DOCUMENTS

| | | | | |
|---|---|---|---|---|
| 2020/0060495 | A1* | 2/2020 | Davila | A47L 9/0477 |
| 2020/0149319 | A1* | 5/2020 | Litwinski | E05B 47/0615 |
| 2020/0173195 | A1* | 6/2020 | Litwinski | E05B 47/0012 |
| 2021/0207401 | A1* | 7/2021 | Cook | G07C 9/00174 |
| 2021/0225100 | A1* | 7/2021 | Jones | G07C 9/00309 |

FOREIGN PATENT DOCUMENTS

| | | | | |
|---|---|---|---|---|
| DE | 102004021704 | | 4/2004 | |
| DE | 102004021704 | B3 * | 12/2005 | E05B 19/00 |
| EP | 2672661 | | 8/2014 | |
| PL | 232588 | | 5/2017 | |
| PL | 242944 | | 8/2020 | |
| WO | 2022015255 | | 1/2022 | |
| WO | WO-2022015255 | A1 * | 1/2022 | E05B 47/0012 |

* cited by examiner

DRIVING DEVICE, IN PARTICULAR FOR CONTROLLING A LOCK EQUIPPED WITH A CYLINDER INSERT, A ROTARY HOUSING OF A DRIVING DEVICE, AND A TOOTHED RING OF A DRIVING DEVICE

TECHNICAL FIELD

Exemplary arrangements provide a driving device, in particular for controlling a lock equipped with a cylinder insert, a rotary housing of a driving device, and a toothed ring of a driving device, in particular for controlling a lock equipped with a cylinder insert, enabling access to protected areas. An exemplary driving device comprises a key turning device that is mounted from the interior of a room, which is from the protected side. In particular, the solution concerns so called "smart locks" which may be opened or closed without direct physical contact of the authorized person with the lock.

BACKGROUND

In construction of driving devices for locks, so called smart devices of a smart lock type, advantageous features are sought. Such advantageous features include a possibility of cooperation of a driving device with locks provided with conventional commonly used cylinder inserts with a normalized cross-sectional profile, openable at both sides with a key, without necessity to modify such cylinder inserts in order to provide the lock with the capability of being used with a driving device.

Solutions known from the prior art that enable the use of a driving device for a conventional cylinder insert with the use of the original key are directed to solutions of driving devices mounted to a door leaf via a special attachment which is first mounted to the door leaf or the cylinder insert, and then to which attachment the driving device is mounted. Such a solution is known for example from the patent specification DE 102004021704 B3 where the driving device has the form of an immovable housing with a rotary knob provided on the housing for manual control of the lock.

Of course, for transferring of driving force from the driving device onto the cylinder insert only a portion of a key (most often a key from which so called head has been cut off to reduce the dimensions of the key protruding from the cylinder insert) may be also used. However, this solution is less preferable since it requires the user to cut the key to the proper length and this is troublesome, and additionally one of the keys, the one that has been cut, is not suitable for normal operation.

Nevertheless, cutting the head of the key off enables obtaining another preferable feature—reduction of the dimensions of the driving device for a lock and this is desirable for the users. A driving device with a smaller size looks better aesthetically, does not alter the appearance of the door and enables use of the driving device for a door that opens to the outside of the protected room, and small dimensions of the device reduce the risk of the body of the device touching the door frame while opening the door. Small dimensions of the device may also cause reduction of its manufacturing costs, and thus its price.

Another desired advantage of driving devices for locks is a possibility to open and close the lock manually from the side of the driving device, with omission of the driving arrangement. This is attained in the prior art by positioning on the body of a driving device a knob for manual control of the lock.

Another way known in the prior art aimed at reduction of the dimensions of the driving device, and the same time convenient manual control of the lock is the use of a driving device in a form of a rotary housing and affixing it to a dedicated cylinder insert rotary control element formed as a shaft. Such solution is known from the Polish patent application P.421767 which corresponds to US Patent Publication 20200173195 which is incorporated herein by reference in its entirety. Nevertheless, this solution has a disadvantage that it requires replacement of the existing cylinder insert in the lock with one that has a conventional outer profile fitting conventional locks, but which is a special cylinder lock equipped with a suitable shaft fitting a specific kind of driving device.

From the specification of the Polish patent application P.434970 a driving device is known and intended in particular for opening and closing, e.g., a lock that has a cylinder insert, enabling access to protected areas. The driving device comprises a driving assembly arranged within a rotary housing and comprising at least a driving motor and a toothed wheel transmission with its terminal toothed wheel that interacts with a toothed ring attached rotatably and coaxially with the housing. The driving device is intended to be seated on a special rotary control element arranged in the body of the cylinder insert. The toothed ring, on its face side, outside with regard to the housing of the driving device to which it is attached, has at least two protrusions that upon attachment of the device on the cylinder insert control element, is positioned relative to the non-circular body of the cylinder insert such that the line joining the two protrusions crosses the area of the cylinder insert body in a cross-section. In this solution it is not possible to use for operation of the driving device a conventional cylinder insert and the original key inserted into the lock cylinder insert from the outside. It is necessary to use a special cylinder insert with a specifically shaped shaft.

In attempts to reduce dimensions of the driving devices for locks the manufacturers have been also seeking the best solutions in construction and position within the driving device of the main subassemblies, that mainly determine the final size of the driving device. Such main subassemblies may include an electric energy source and a gear transmission.

A large and high-capacity electric energy source (for example composed of several primary or secondary cells) ensures long-time operation of the driving device between the successive battery exchange or battery recharging (and this is advantageous) but the use of a large electric energy source increases the dimensions of the driving device. Such solution is disclosed in the European application EP 2762661 A1 where four cylindrical electric cells are used in an immovable housing of a driving device, outside the region of rotary element that transfers driving force to the cylinder insert.

Another advantageous feature of driving devices for locks is obtaining a suitably large torque that enables controlling locks of a greater number of locking points and thus greater operational resistance. Obtaining suitably large torque requires use of a suitably effective, and thus a big, electric motor and this involves disadvantageous enlarging of the dimensions of the driving device.

This is why in the construction of solutions of the smart lock type, regardless of the technology for manufacturing cells, it is desirable to develop constructive solutions for a driving device that while maintaining simple construction of the driving device that allows for obtaining an advantageous proportion between the volume of the electric energy source and the volume of the entire driving device, and at the same time although a suitably large electric motor is used, enable maintaining small dimensions of the driving device.

In the prior art the solutions of the Polish patent application P.421765 and of the Polish patent application P.421766 which correspond to US Patent Publication 2020149319 which is incorporated herein by reference in its entirety, a special cell is used with a recess or opening in which recess or opening an electric motor of the driving device is arranged. This solution is very effective and enables considerable reduction of the dimension of the driving device while maintaining proportionally big volume and thus high electric capacity of the source of electric current. Nevertheless, this solution has a disadvantage that it requires the use of a non-conventional cell of a special construction and thus is not as economically effective. Much more economically effective is the use of typical cylindrical primary or secondary electric cells that are a conventionally manufactured kind of cells. Also economically preferable is the use of the conventionally manufactured secondary cells with a shape similar to a rectangular prism, so called “pouch” type cells.

From the specification of the Polish patent application P.434970 a driving device is known intended in particular for opening and closing, e.g., a lock that has a cylinder insert, enabling access to protected areas. The driving device comprises a driving assembly arranged within a rotary housing and comprising at least a driving motor and a toothed wheel transmission with its terminal toothed wheel that interacts with a toothed ring attached rotatably and coaxially with the housing. The driving device is intended to be seated on a special rotary control element arranged in the body of the cylinder insert. The toothed ring, on its face side, outside with regard to the housing of the driving device to which it is attached, has at least two protrusions that upon attachment of the device on the cylinder insert control element, it is positioned relative to the non-circular body of the cylinder insert such that the line joining the two protrusions crosses the area of the cylinder insert body in a cross-section. In this solution it is not possible to use in the operation of the driving device, a conventional cylinder insert and the original key inserted into the lock cylinder insert from the outside. It is necessary to use a special cylinder insert with a specifically shaped shaft.

Prior driving devices may benefit from improvements.

SUMMARY

Exemplary arrangements described herein eliminate the above indicated disadvantages of the existing solutions and provide a new solution for a driving device that enables mounting thereof on existing conventional cylinder inserts without necessity for modification thereof. The device is a key turning device that is able to interact with and selectively turn and position a complete key from the side at which the device is mounted to the cylinder insert without necessity to cut the key. The exemplary arrangement provides a small size for the driving device, and a rotary housing in a form that is convenient for manual control. In the exemplary arrangement, the manner of positioning of main subassemblies that have the most relevant impact on the final size of a driving device, such as an electric energy source, an electric motor and a gear transmission, provides minimized dimensions of the device while maintaining the advantageous ratio between the volume of electric cells to the volume of the entire driving device. In the exemplary arrangement commonly available cylindrical or cuboid cells are used. The exemplary arrangement enables use of effective, and thus relatively big electric motors while maintaining small size of the driving device. As a result, the exemplary driving device has a simple and compact construction and is advantageous over the prior art devices.

In an exemplary arrangement, a driving device, in particular a key turning device for controlling a lock equipped with a cylinder insert, enabling access to protected areas, comprises a driving assembly arranged within a rotary housing. The driving assembly comprises an electric energy source, a driving motor and a toothed wheel transmission with a terminal toothed wheel, which is alternatively referred to herein as an output gear. The output gear is in meshing cooperating engagement with an arcuate gear segment within a mount ring which is also referred to herein as a toothed ring.

The exemplary driving device is intended for interaction with a rotary control element such as a key cylinder arranged in the body of a cylinder insert of a lock that is changeable between a locked condition and an unlocked condition. The cylinder insert is releasably engageable with a key that has a head, shoulder and blade. The blade of the key is positioned in engagement with the insert control element. The head and the shoulder of the key protrude axially outside the control element of the cylinder insert. The key head has a thickness defined as the distance between its flat sides, and a width defined as the distance between the radially outermost points of the key head in a direction perpendicular to the rotation axis of the control element, between the outer end of the key head and the key shoulder.

When the driving device is mounted to the cylinder insert, the toothed ring from a face side axially opposite to the rotary housing encloses, at least partially a cylindrical body portion that includes the terminal part of the cylinder insert body to provide suitable positioning of the driving device relative to the cylinder insert and comprises means to secure the toothed ring immovably relative to the cylinder lock body. The toothed ring has a central opening through which the rotation axis of the cylinder insert control element extends and the dimension of the central axis enables rotation of the key shoulder in the central opening.

The rotary housing is movably mounted on and seated in a bearing rotationally and axially immovable and non-slidably on the toothed ring. The rotary housing comprises means for transferring rotational driving force onto the control element of the cylinder insert through the key.

The rotary housing of the exemplary driving device is provided with a key pocket therein in a form of a recess. The key pocket is open at the axial side of the toothed ring and symmetrical with regard to the rotation axis of the housing. The key pocket, in the cross-section perpendicular to the rotation axis of the rotary housing, has a form of an elongated rectangular slot the longitudinal axis of which extends through the rotation axis of the rotary housing. This means that in this cross-section the slot has a length greater than its width. The length of the slot is not smaller than the width of the key head of the key that is in engagement with the cylinder insert. At the same time, the length of the slot is not smaller than the thickness of the head of the key in the cylinder insert. This enables the key head to be engaged in the key slot in a manner that provides for the key to be rotationally immovable relative to the housing.

A plane that comprises the rotation axis of the rotary housing and the longitudinal axis of the key pocket slot perpendicular thereto, divides the internal area of the exemplary housing into two portions, which are each referred to herein as internal housing portions. In one internal portion of the exemplary rotary housing, a driving motor and a gear transmission with a terminal toothed wheel are housed, while in the other internal portion of the rotary housing at least one electric cell is arranged constituting an electric energy source.

In an exemplary arrangement with the driving motor at one side of the key pocket and the at least one electric cell at the other side of the key pocket, there are points such that a line segment that connects a point in the driving motor to a point in the electric cell crosses the key pocket.

In some exemplary arrangements, the electric energy source comprises at least one electric energy source comprising at least one electric cell with a cylindrical shape.

Also in some exemplary arrangements, the electric energy source comprises at least one electric cell with a shape similar to a cube.

In some exemplary arrangements, the key pocket formed in the rotary housing with the key head therein along with a key blade positioned within the cylinder insert, constitute means for transferring the rotational driving force onto the cylinder insert control element such that the control element may be selectively rotationally positioned to control the condition of the lock.

Also in exemplary arrangements, the rotary housing is provided with a removable outer casing in a form of an outer sleeve with a bottom. The outer sleeve is arranged slidably on the rotary housing and attached to the rotary housing via a releasable radial catch. After the outer casing is removed access to the electric cells is enabled.

In some exemplary arrangements the outer casing is provided with a bottom in a form of an elastic membrane. The compliance of which membrane responsive to manual contract enables controlling elements within the rotary housing beneath the bottom.

In exemplary arrangements within the rotary housing along its longitudinal axis, axially above the key head, a pressure pad is positioned. The pressure pad is pressed against the key by a spring that on the other side abuts an inner element of the rotary housing.

In some exemplary arrangements a driving device, in particular for controlling a lock equipped with a cylinder insert, enabling access to protected areas, comprises a driving assembly arranged within a rotary housing. The driving assembly includes an electric energy source, a driving motor and a gear transmission with a terminal toothed wheel cooperating with a toothed ring.

The driving device is intended to cooperate with a rotary control element such as a key cylinder arranged within the body of a cylinder insert, said body having a cylindrical part, and the cylinder insert being releasably engageable with a key that has a head, a shoulder and a blade. The key blade is positioned within the control element of the cylinder insert. The shoulder and the head of the key extend axially beyond and outside the cylinder insert. The key head has a thickness defined as the distance between the flat sides thereof and a width (dimension A) defined as the distance between the furthermost radially outward points of the key head in a direction perpendicular to the rotation axis of the control element, between the axially outer end of the key head and the shoulder of the key.

When the driving device is mounted to a cylinder insert, the mount ring on the axial side opposite to the rotary housing encloses at least partially a cylindrical body portion which comprises the terminal part of the cylinder insert body to provide proper positioning of the driving device with regard to the cylinder insert, and comprises means for mounting the mount ring immovably with regard to the cylinder insert body. The exemplary ring has a central opening through which the rotation axis of the cylinder insert control element extends, and the size of the central opening enables rotation of the key shoulder within the central opening.

The exemplary rotary housing is rotationally seated in a bearing and axially immovably on the mount ring. The rotary housing comprises means including the key for transmission of the driving force onto the cylinder insert control element.

In some exemplary arrangements the central opening in the mount ring includes a slot that in a cross-section transverse with regard to the rotary housing rotation axis, has an elongated shape and this means that in this cross-section the slot has a length that is greater than its width.

The exemplary rotary housing of the driving device is equipped with a key pocket that is open from the axial side of the mount ring. The exemplary key pocket has the form of a cavity symmetrical with regard to the rotary housing rotation axis. The key pocket, in its cross-section transverse to the rotary housing rotation axis, has a form of an elongated key pocket slot, the longitudinal axis of which extends through the rotary housing rotation axis. This means that in this cross-section the key pocket slot has a length greater than its width. In some exemplary arrangements the diametric length of the ring slot in the mount ring and the diametric length of the key pocket slot are not smaller than the width A of the key head for the key, the blade of which is engaged with the control element of the cylinder insert. The length of the ring slot in the mount ring and the length of the key pocket slot are greater than the diameter of a circle inscribed in the central opening of the mount ring. At the same time the width of the mount ring slot and the width of the key pocket slot are not smaller than the thickness of the key head, and are smaller than the diameter of a circle inscribed in the central opening of the mount ring.

In some exemplary arrangements the central opening in the mount ring includes a circular portion that has a round shape. The length of the intersecting mount ring slot is greater than the diameter of the circular portion of the central opening. The width of the exemplary mount ring slot, at least close to the circular portion of the central opening, is smaller than the diameter of the circular portion of the central opening.

In some exemplary arrangements a plane comprising the rotary housing rotation axis and the longitudinal axis of the key pocket slot perpendicular thereto divides the internal area of the rotary housing into two internal housing portions, wherein in one internal housing portion of the rotary housing two cylindrically shaped electric cells are arranged, and in the other internal housing portion of the rotary housing a driving motor, a gear transmission with a terminal toothed wheel which is also referred to herein as an output gear, and one cylindrically shaped electric cell are arranged. In such an exemplary arrangement the three cylindrical electric cells constitute the source of electric energy. The diameter of the driving motor is of a substantially cylindrical shape and the diameters of the cylindrical electric cells are approximately equal to that of the motor. In some exemplary arrangements the axis of the driving motor and the axes of the cylindrical electric cells are positioned parallel with regard to the rotary housing rotation axis at approximately equal distances from the axis and at approximately equal distances from the key pocket.

In some exemplary arrangements the rotary housing rotation axis defined in the rotary housing along with the key inserted into the cylinder insert and with the key head positioned within the key pocket, constitute means for transferring the rotational driving force to the control element of the cylinder insert.

In some exemplary arrangements in the rotary housing along its longitudinal axis axially outward from the key head a pressure pad is positioned that is slidable along the longitudinal axis of the rotary housing. The exemplary pressure pad is axially pressed against the key by a spring that on the other side of this spring abuts an inner element of the rotary housing.

In some exemplary arrangements the driving device is secured via the mount ring solely to the body of the lock cylinder insert.

Also in some exemplary arrangements the housing is seated in a bearing rotationally and axially immovably solely on the mount ring.

In some exemplary arrangements the rotary housing is seated in a bearing on the mount ring so that when the driving device is mounted to the cylinder insert, the rotary housing rotation axis coincides with the rotation axis of the control element of the cylinder insert.

In some exemplary arrangements when the driving device is mounted to the cylinder insert the longitudinal axis of the ring slot is perpendicular to the axis of the cross-section of the cylinder insert.

In some exemplary arrangements the driving device is provided with a removable outer casing in a form of an outer sleeve with a bottom, arranged slidably on the rotary housing and attached to the rotary housing via a radial catch, wherein after the outer casing is removed access to the electric cells is enabled.

In some exemplary arrangements when the outer casing is provided with a bottom in a form of an elastic membrane, the compliance of which with manual engagement enables controlling elements arranged on the face of the rotary housing beneath the bottom, such as for example a switch such as a microswitch.

In some exemplary arrangements a rotary housing of a driving device, in particular for controlling a lock equipped with a cylinder insert, enabling access to protected areas, comprises a driving assembly accommodated within the rotary housing. The driving assembly encompasses an electric energy source, a driving motor and a gear transmission with a terminal toothed wheel also called an output gear cooperating with a toothed ring which is also called a mount ring.

The exemplary rotary housing is intended to cooperate with a rotary control element which is also referred to as a key cylinder, arranged within the cylinder insert. The cylinder insert is provided with a key blade of a key inserted into the control element.

The key has a head, a shoulder and a blade. The head and the shoulder of the key protrude axially beyond the control element of the cylinder insert. The key head has a thickness defined as the distance between its flat sides and a width (dimension A) defined as the distance between the furthermost radially outward points of the key head between the key head outer end and the key shoulder.

The rotary housing is seated in a bearing such that it is rotationally movable and axially immovable relative to the mount ring. After the rotary housing of the driving device is mounted to the cylinder insert, and an opening of the mount ring, on a mount ring face on the side axially opposite to the rotary housing, encloses at least partially a cylindrical body portion which comprises the terminal part of the body of the cylinder insert. The mount ring comprises means for securing the mount ring immovably with regard to the body of the cylinder insert. The opening in the mount ring also comprises a central opening through which the rotation axis of the control element of the cylinder insert extends, and the size of the central opening enables rotation of the key shoulder within the central opening. The rotary housing comprises means for transferring the rotational driving force onto the control element of the cylinder insert.

In some exemplary arrangements the exemplary rotary housing, from the side of the mount ring, is provided with a key pocket in a form of a recess, which is symmetrical with regard to the rotary housing rotation axis. The key pocket, in its cross-section transverse to the rotary housing rotation axis, has a form of an elongated key pocket slot, the longitudinal axis of which extends through the rotary housing rotation axis. This means that in this cross-section the key pocket slot has a length greater than its width. The length of the key pocket slot is not smaller than the width A of the head of the key for the cylinder insert, and the width of the key pocket slot is not smaller than the thickness of the head of the key for the cylinder insert.

A plane comprising the rotary housing rotation axis and the longitudinal axis of the key pocket slot perpendicular thereto, divides the rotary housing into two internal housing portions. In one internal housing portion of the rotary housing two cylindrically shaped electric cells are arranged, and in the other portion internal housing of the rotary housing a driving motor, a gear transmission with an output gear, and one cylindrically shaped electric cell are positioned, and the three cylindrically shaped electric cells constitute the source of electric energy. In some exemplary arrangements the axis of the driving motor and the axes of the cylindrical electric cells are positioned parallel with regard to the rotary housing rotation axis at approximately equal distances from the axis and at approximately equal distances from the key pocket.

In some exemplary arrangements the body of the driving motor is of a substantially cylindrical shape and the diameters of the cylindrical electric cells and the body of the motor are approximately equal.

In some exemplary arrangements the key pocket defined in the rotary housing along with the key inserted into the cylinder insert, and the key head positioned within the key pocket constitute means for transferring the driving force onto the control element of the cylinder insert.

Further in some exemplary arrangements the rotary housing is provided with a removable outer casing in a form of an outer sleeve with a bottom, arranged slidably on the rotary housing and attached to the rotary housing via a radial catch, wherein after the outer casing is removed access to the electric cells is enabled.

In some exemplary arrangements when the outer casing is provided with a bottom in a form of an elastic membrane, the compliance of which membrane in response to manual contact enables controlling elements on the face of the rotary housing within the outer casing beneath the bottom.

In some exemplary arrangements a mount ring of a driving device with a rotary housing, in particular for controlling a lock, enabling access to protected areas, is intended to cooperate with the cylinder insert having a body with a cylindrical part. The cylinder insert cooperates with a key having a head, a shoulder and a blade, where the head is at least twice as wide as the shoulder. The key head has a thickness defined as the distance between its flat sides and a width (dimension A) defined as the distance between the furthermost radially outward points of the key head between the axially outer end of the key head and the shoulder of the key.

After the key is inserted into the cylinder insert, the head and the holder of the key protrude axially outward beyond the control element of the cylinder insert. The mount ring, at the axial side opposite to the rotary housing, comprises means for securing the mount ring immovably with regard to the body of the cylinder insert. In some arrangements the mount ring has a central opening through which the rotation axis of the control element of the cylinder insert extends, and the size of the central opening enables rotation of the key shoulder within the central opening. The rotary housing is seated in a bearing rotationally movable and axially immovable on the mount ring and it comprises means for transferring the driving force onto the control element of the cylinder insert.

In some exemplary arrangements the central opening in the mount ring includes a ring slot that extends and has an elongated shape in its cross-section transverse to the rotary housing rotation axis, and thus to the longitudinal axis of the mount ring. This means that in this cross-section the ring slot has a diametric length greater than its width. The longitudinal axis of the ring slot extends through the rotary housing rotation axis and extends perpendicular thereto. The length of the ring slot may be smaller than the width A of the head of the key for the cylinder insert. At the same time, the width of the ring slot is not smaller than the thickness of the key head. The diameter of a circle inscribed in the central opening of the mount ring is greater than the width of the key shoulder and is smaller than the length of the ring slot as well as greater than the width of the ring slot.

In some exemplary arrangements the central opening in the mount ring has a central circular portion with a round shape which at least partially reflects the shape of the cylindrical part of the body of the cylinder insert, and the diametric length of the intersecting ring slot is greater than the diameter of the central circular portion of the central opening, and the width of the ring slot, at the point of the ring slot axially crossing the circular portion of the central opening, is smaller than the diameter of the central opening.

Also in some exemplary arrangements on the mount ring a rotary housing is seated in a bearing such that the housing is rotationally movable relative to the mount ring and axially immovable relative to the mount ring.

DETAILED DESCRIPTION

Figure 1:
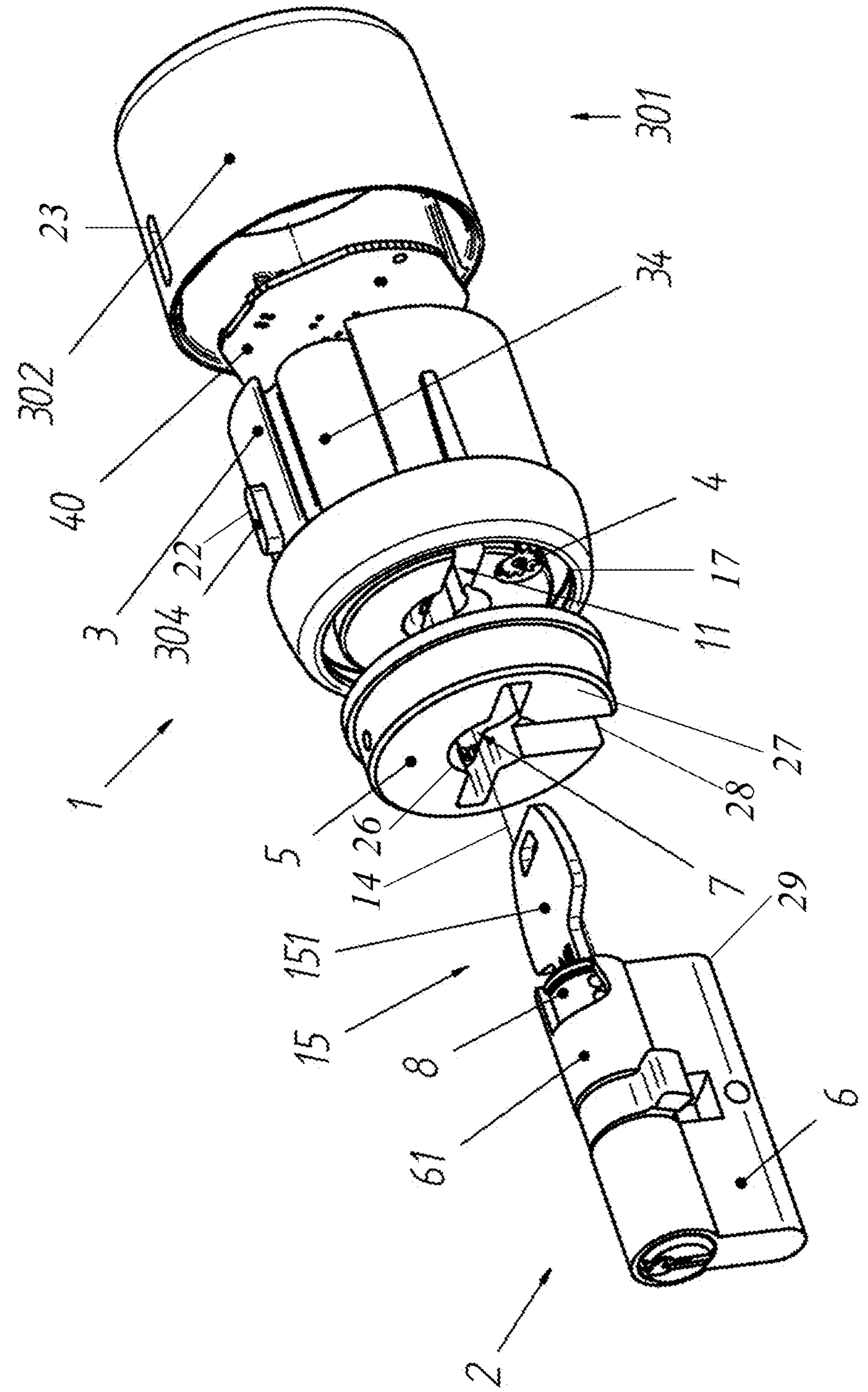
FIG. 1 shows an exemplary driving device for closing and opening a lock, in an exploded perspective view at the side of the cylinder insert of the lock, with a broken out portion showing a control element of the cylinder insert.
Figure 2:
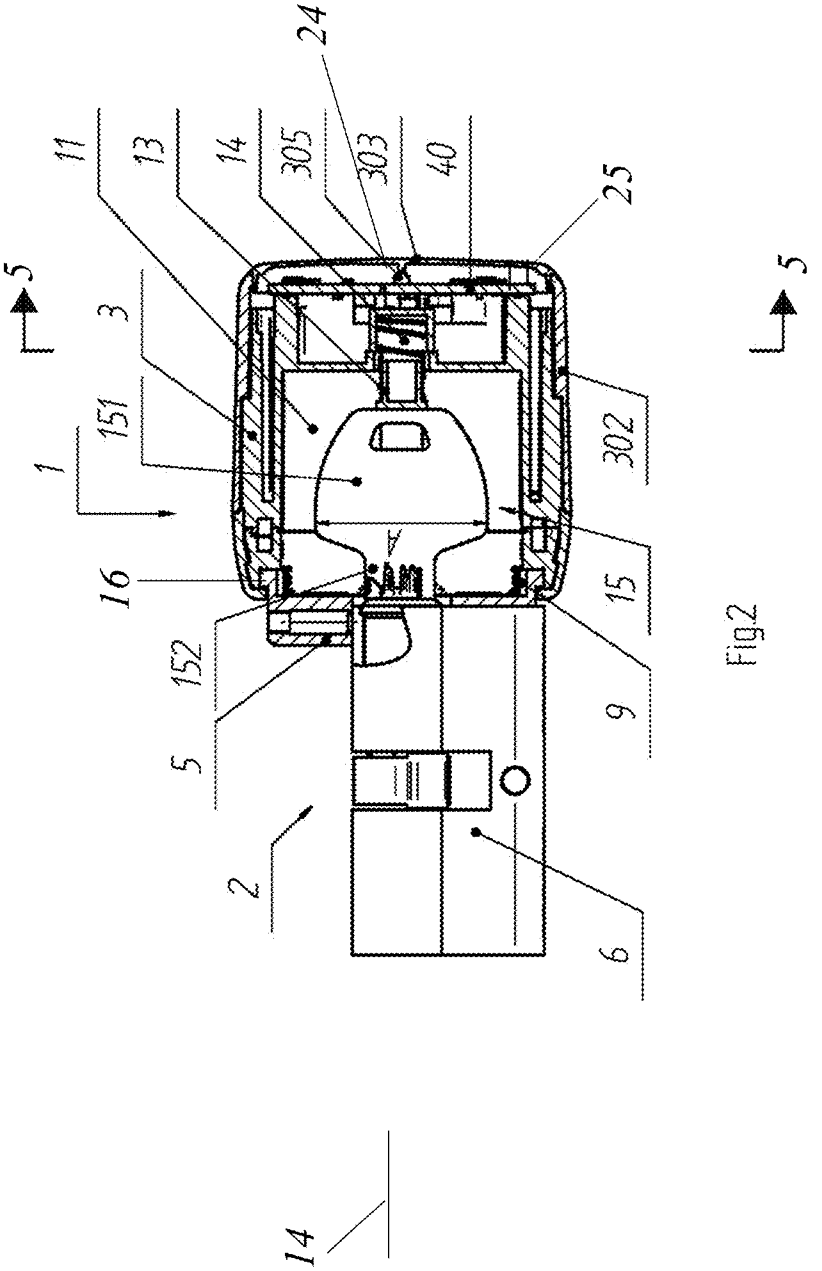
FIG. 2 shows a driving device for closing and opening a lock, mounted on an insert, in a longitudinal section along the longitudinal axis.

Referring now to the drawings and particularly to FIG. 1 and FIG. 2 an exemplary lock comprises a conventional profiled cylinder insert 2 mounted for example in a mortise lock in a door leaf. The exemplary cylinder insert 2 of the lock enables access to protected areas and is changeable between a locked condition and an unlocked condition. The insert 2 includes a body 6 in which a control element 8 which is alternatively referred to herein as a key cylinder, is attached in rotationally movably mounted relation (as seen in FIG. 1 and FIG. 2) to the cylinder insert 2 of the lock. The control element 8 of the cylinder insert 2 of the lock may rotate within the body 6 of the cylinder insert 2 of the lock about an axis 14, but cannot move with regard thereto along the longitudinal axis 14 of the body 6 of the cylinder insert 2 of the lock. As shown in FIG. 1 and FIG. 2, the body 6 of the exemplary cylinder insert 2 has a cylindrical part 61 in which the control element 8 of the cylinder insert 2 of the lock is accommodated. Within the body 6 and the control element 8 of the cylinder insert 2 there are also arranged coding elements of the insert to cooperate with a blade 153 of a key 15 inserted into the cylinder insert 2 of the lock and engaged with the key cylinder 8. The key 15 is provided with a head 151 intended to be manually grasped when rotating the key 15 within the insert 2 of the lock when it is being opened. The head 151 of the key 15 has a thickness defined as the distance between its flat sides and a width defined as the distance between the furthermost radially outward points of the head 151 of the key 15 between its axially outer end and the shoulder 152 of the key 15, as shown in FIG. 2 (dimension A).

As shown in FIG. 1, FIG. 2, FIG. 3, FIG. 4, FIG. 5, FIG. 6, FIG. 7, and FIG. 8, in some exemplary arrangements, a driving device 1 which is alternatively referred to as a key turning device, in particular for closing and opening of a cylinder insert 2 of a lock, comprises a rotary housing 3 which is alternatively referred to herein as a housing, in which a driving assembly is arranged.

Figure 3:
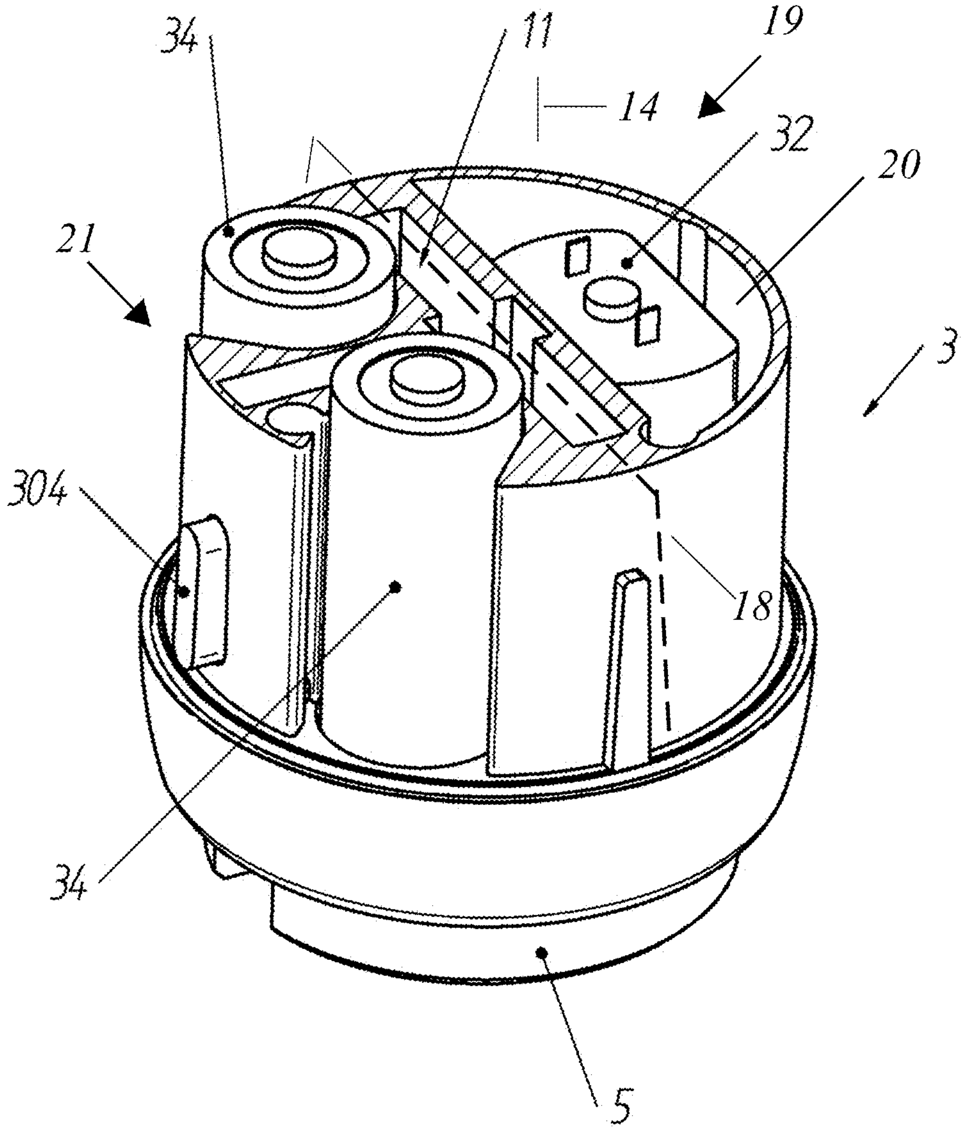
FIG. 3 shows a rotary housing with an outer casing removed, in a perspective view, with a section of the rotary housing.
Figure 4:
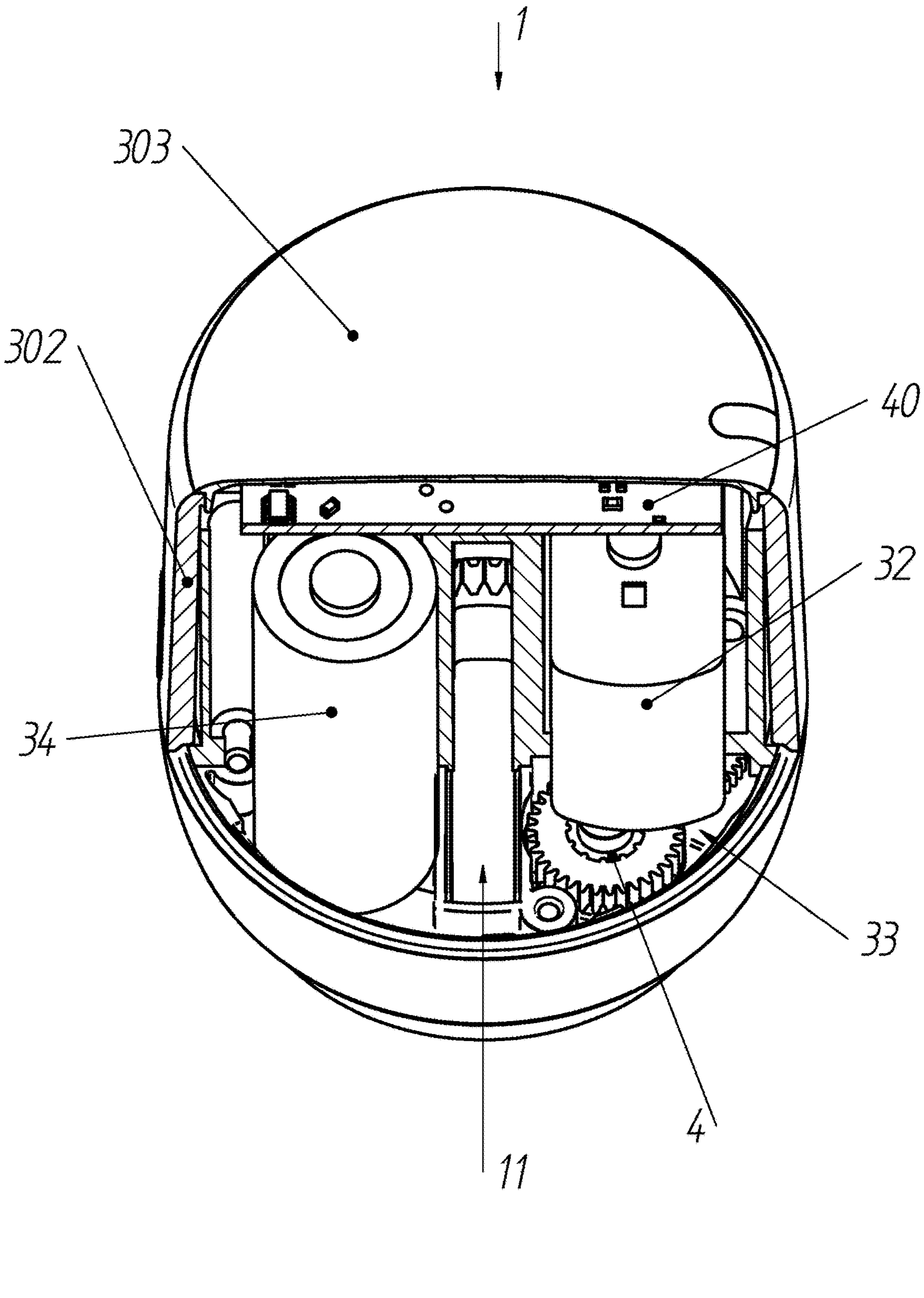
FIG. 4 shows a rotary housing in another view with an outer casing removed and a partial section of the rotary housing.
Figure 5:
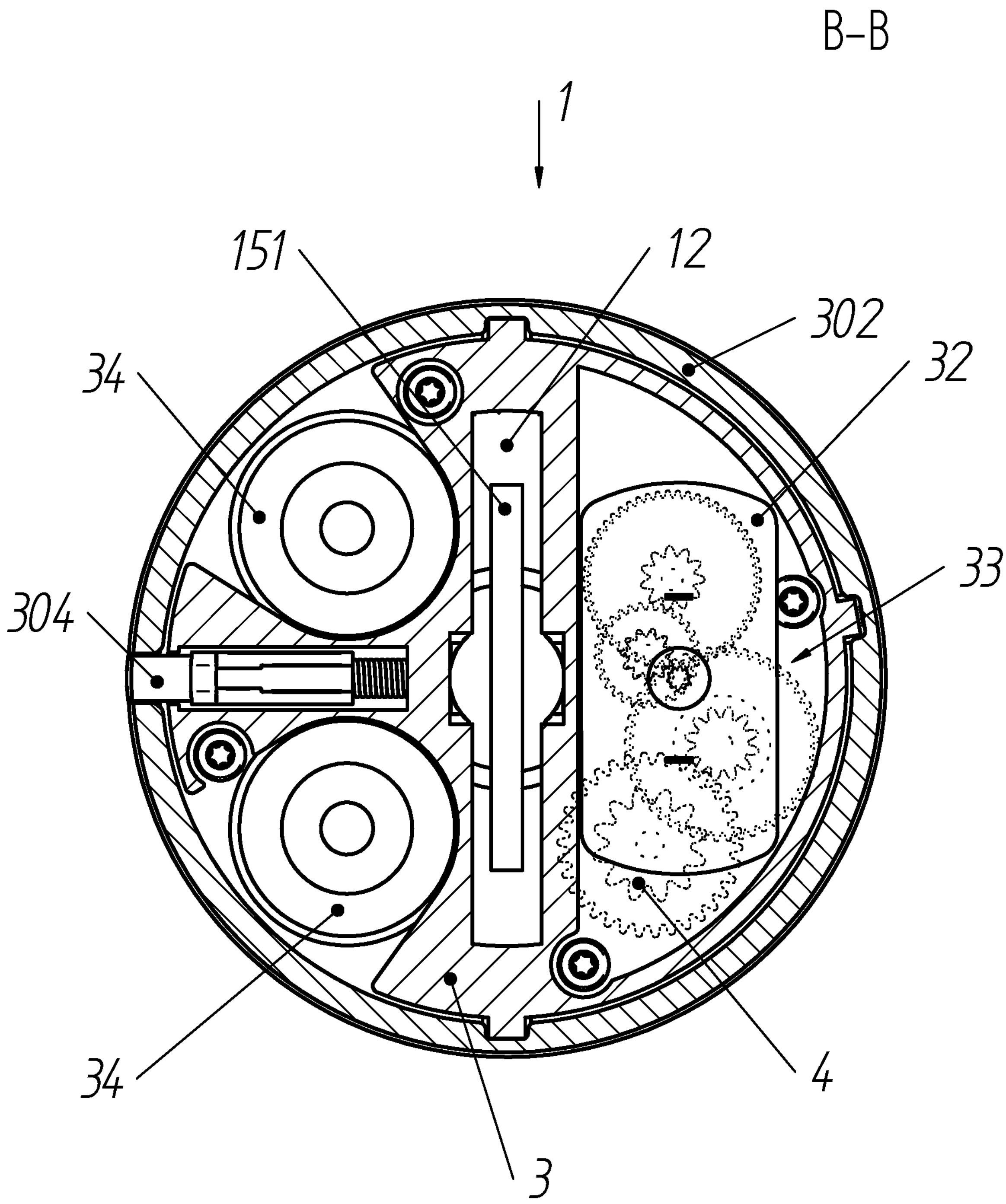
FIG. 5 shows a rotary housing in a cross-section taken along the line 5-5 in FIG. 2.

The driving assembly comprises, in an exemplary arrangement shown in FIG. 3, FIG. 4, and FIG. 5, two electric cells 34 having a cylindrical shape, a driving electric motor 32 in operative connection with a gear transmission 33 with a terminal toothed wheel 4 which is alternatively referred to as an output gear (seen in FIG. 1). The exemplary toothed wheel 4, being the terminal element of the gear transmission 33 of the driving assembly, cooperates with a toothed ring 5 which is alternatively referred to as a mount ring (seen in FIG. 1 and FIG. 2). The mount ring 5 has an internal gear toothing 9 which is alternatively referred to as a gear ring that comprises an axially centered arcuate gear segment with a plurality of radially inwardly directed gear teeth (as shown in FIG. 2). During rotation when operating the driving motor 32, the terminal toothed wheel 4 rolls upon and meshingly engages the internal gear toothing 9 of the mount ring 5. The electric energy source, which delivers electric power to the motor, as shown in FIG. 3 and FIG. 5, is constituted by two cylindrical electric cells, and these may be both primary and secondary cells.

Figure 6:
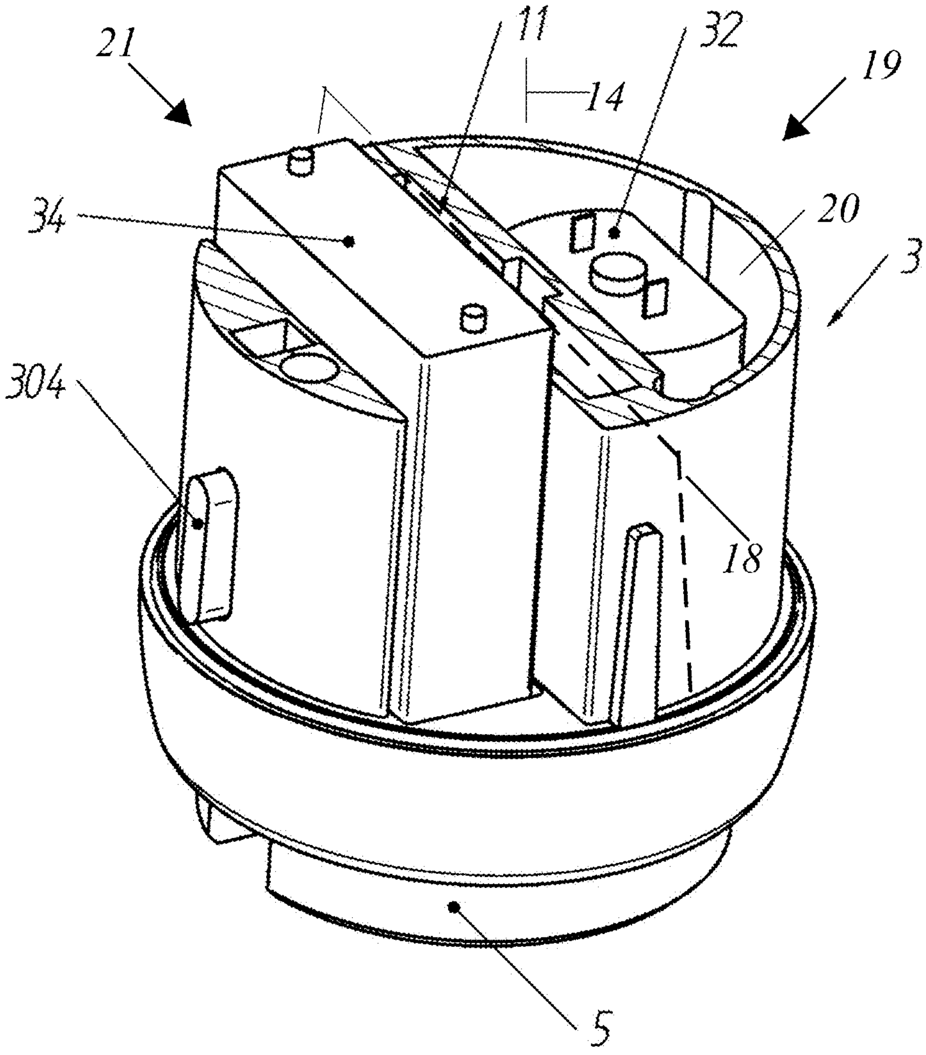
FIG. 6 shows a rotary housing with a removable outer casing, in a perspective view, with a section of the rotary housing.
Figure 7:
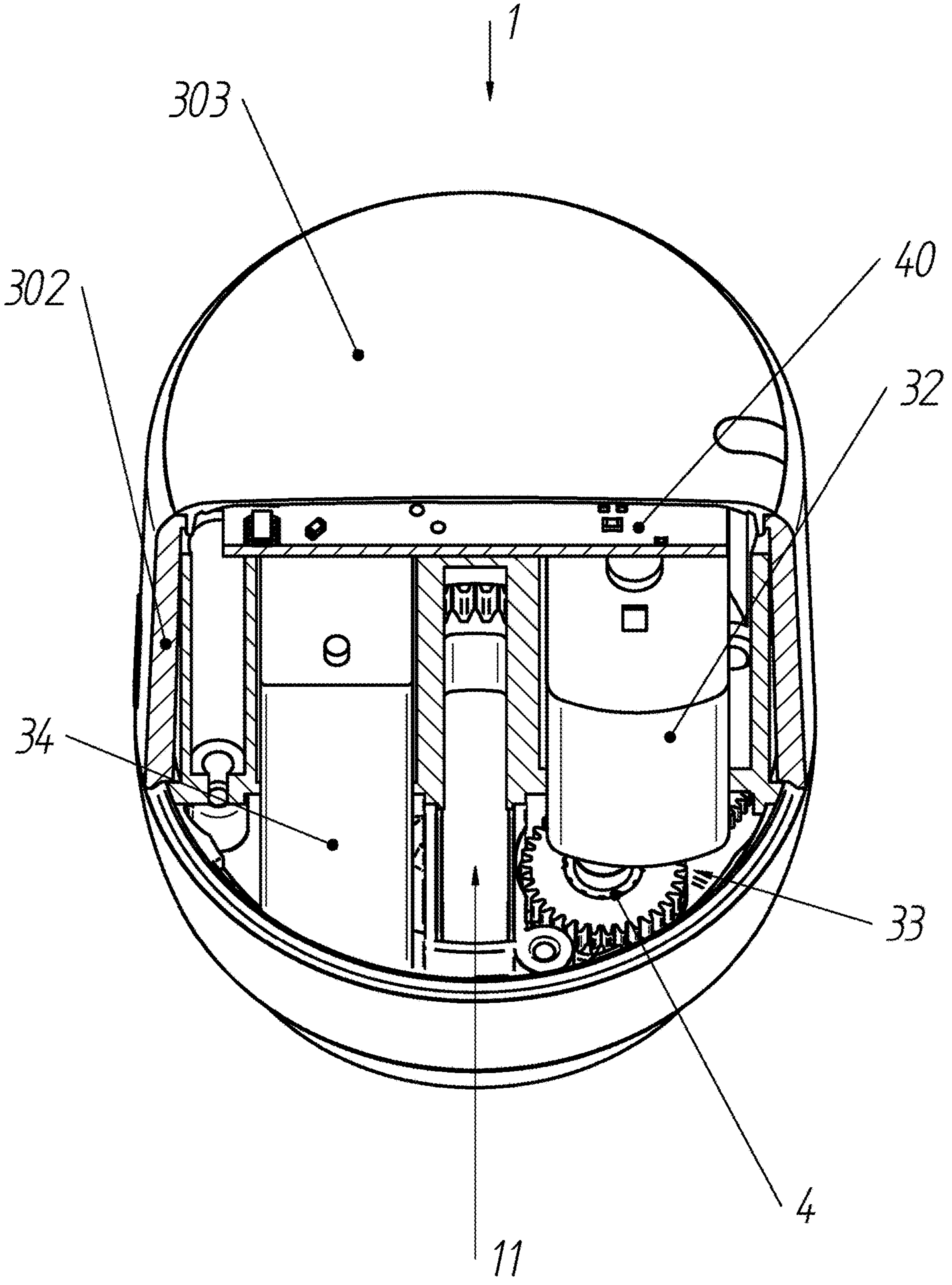
FIG. 7 shows a rotary housing in another view with an outer casing partially removed, and a partial section of the rotary housing.
Figure 8:
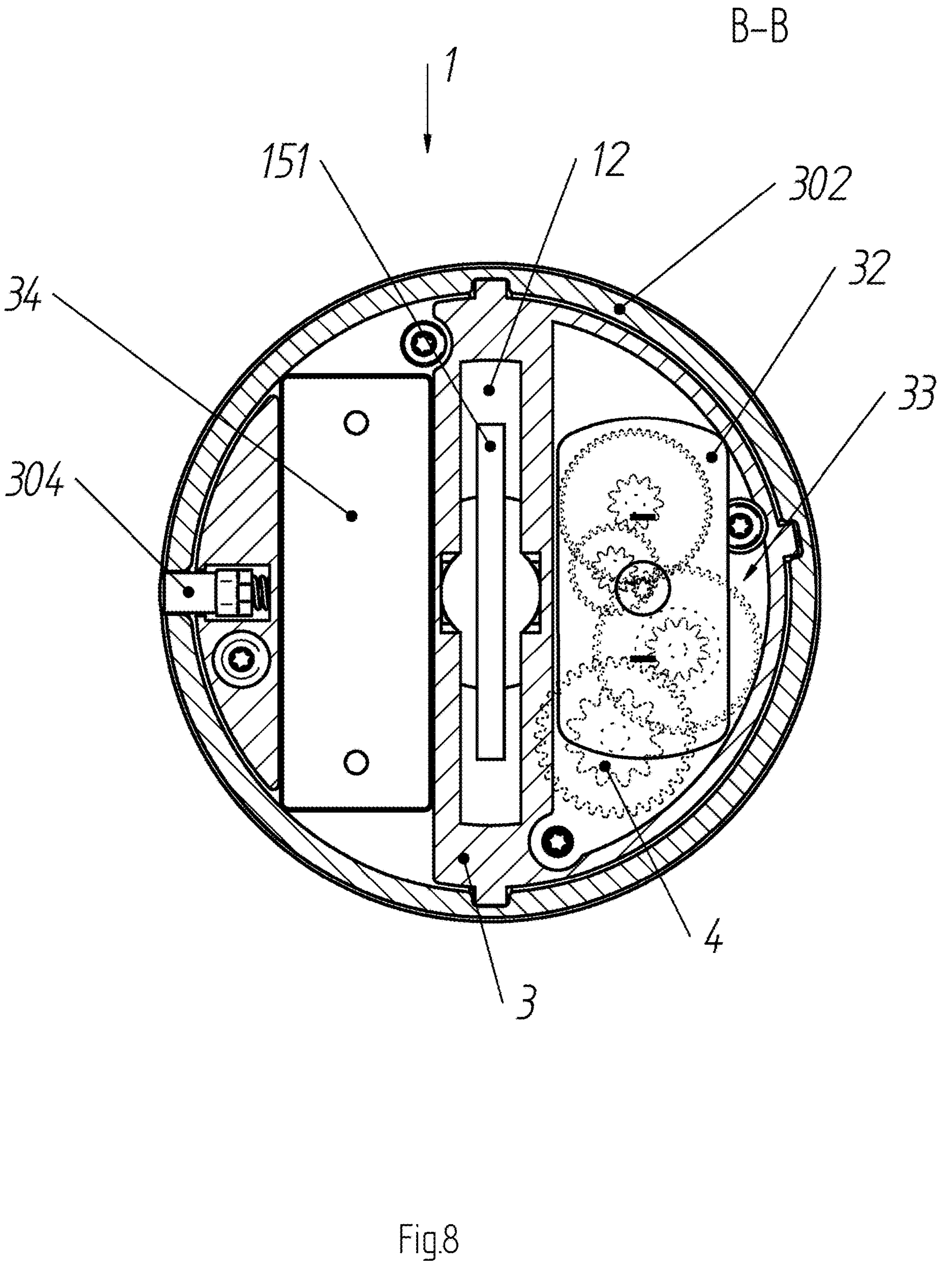
FIG. 8 shows a rotary housing in transverse cross-section.

In an alternative exemplary arrangement shown in FIG. 6, FIG. 7 and FIG. 8, a driving assembly comprises one electric cell 34 having a shape similar to a rectangular prism (for example, so called prismatic cell or a pouch-type cell).

A mount ring 5 is seated and engaged immovably with regard to the body 6 of the cylinder insert 2, as shown in FIG. 2. The rotary housing 3 is seated in a bearing which comprises the radially outward extending annular projection 16 on the mount ring 5, which axially extends in the axially centered annular opening 17 of the housing 3 which provides for the housing to be rotationally movable relative to the mount ring and axially immovable relative to the mount ring 5. In the exemplary arrangement the rotary housing 3 comprises means for transferring the rotational driving force onto the control element 8 of the cylinder insert 2 to selectively rotationally position the control element and thereby selectively place the lock in the locked condition or the unlocked condition. Of course, numerous ways for securing the mount ring immovably with regard to of the cylinder insert 2 or other lock body structures are possible.

In an exemplary arrangement shown in FIG. 2, the rotary housing 3 is seated in a bearing on the mount ring 5 so that when the driving device 1 is mounted to the cylinder insert 2 the rotation axis 14 of the rotary housing 3 coincides the rotation axis of the control element 8 of the cylinder insert 2.

In an exemplary arrangement as shown in FIG. 1, FIG. 2, FIG. 3, FIG. 4, FIG. 5, FIG. 6, FIG. 7, and FIG. 8, the exemplary rotary housing 3, at the side of the mount ring 5, is provided with a key pocket 11 which is constituted by an opened, at the axial side of the mount ring 5, recess in the rotary housing 3, symmetrical with regard to the rotation axis 14 of the rotary housing 3, and having in its cross-section a form of an elongated key pocket slot 12 (shown in FIG. 5 and FIG. 8), having substantially a shape of an elongated rectangle the longitudinal axis of which slot extends through rotation axis 14 of the rotary housing 3. At the same time the length of the key pocket slot 12 in the rotary housing 3 is not smaller than the width A of the head 151 of the key 15 for the cylinder insert 2, and the width of the key pocket slot 12 in the rotary housing 2 is not smaller than the thickness of the head 151 of the key 15 for the cylinder insert 2. Such length and width of the key pocket slot 12 enable the possibility of axially inserting the head 151 of the key 15 into the key pocket 11. The axial depth of the key pocket 11, is greater than the length of the head 151 along with the shoulder 152 of the key 15 axially protruding from the cylinder insert 2.

To facilitate silent operation of the driving device 1, in exemplary arrangements the width of the key pocket slot 12 is slightly greater than the thickness of the head 151 of the key 15. This enables the key to be rotationally immovable relative to the housing and to limit the idle angular movement of the housing 3 relative to the head 151 of the key 15 before rotationally immovable engagement occurs when operation of the driving device 1 is initiated.

In an exemplary arrangement shown in FIG. 3, FIG. 4, and FIG. 5, a plane 18 comprising rotation axis 14 of the rotary housing 3 and the longitudinal axis of the key pocket slot 12 perpendicular thereto divides an internal area 19 of the rotary housing 3 into two internal housing portions. In a first internal housing portion 20 of the rotary housing 3, positioned at one side of the plane 18 that divides the internal area of the housing into two portions, a driving motor 32 is positioned as is a gear transmission 33 (shown in FIG. 4 and FIG. 5). In a second internal housing portion 21 of the rotary housing 3, positioned at the other side of the plane 18 that divides the rotary housing into two portions, in the view shown in FIG. 3 and FIG. 5 two electric cells 34 of a cylindrical shape are arranged.

In an exemplary arrangement shown in FIG. 6, FIG. 7, and FIG. 8, a plane 18 comprising the rotation axis 14 of the rotary housing 3 and the longitudinal axis of the key pocket slot perpendicular thereto 12 divides internal area 19 of the rotary housing 3 into two internal housing portions. A first internal housing portion 20 of the rotary housing 3, positioned at one side of the plane 18 that divides the housing into two portions, a driving motor 32 is arranged and a transmission 33 (shown in FIG. 7 and FIG. 8). In a second internal housing portion 21 of the rotary housing 3, positioned at the other side of the plane 18 that divides the rotary housing into two portions, in the view shown in FIG. 6, FIG. 7, and FIG. 8, one electric cell 34 having a shape similar to a rectangular prism is arranged.

Of course, it is possible to arrange the elements of the driving assembly differently, with the driving motor 32 and the gear transmission 33 and electric cells 34 at both sides of the key pocket 11 in the rotary housing 3, but in some arrangements it may be useful to provide points in the driving motor 32 at one side of the key pocket 11 (at which also the gear transmission is positioned) and in any electric cell 34 at the other side of the key pocket 11 such that a line section that connects the point on the driving motor 32 and the point on the electric cell 34 crosses the key pocket 11.

In an exemplary arrangement as shown in FIG. 3, FIG. 4, and FIG. 5 and in an exemplary arrangement as shown in FIG. 6, FIG. 7, and FIG. 8, both in any cylindrical electric cell 34 of the exemplary arrangement as well as in the electric cell 34 having a shape similar to a rectangular prism of the exemplary arrangement, there exist several points such that their connection of numerous other points that can be isolated in the driving motor 32 form a line section (in the geometrical meaning) that crosses the key pocket 11 in the rotary housing, 3 and this means that these elements are positioned at the opposite sides of the key pocket 11 in the internal area of the rotary housing 3.

In some exemplary arrangements in order to fulfil this condition it is sufficient to arrange one electric cell 34 at the other side of the key pocket 11 with regard to the position of the driving motor 32 and the gear transmission 33.

In exemplary arrangements the key pocket 11 defined in the rotary housing 3 along with the key 15 inserted into the cylinder lock 2 and the head 151 of the key 15 positioned within the key pocket 11 constitute means for transferring the driving force produced by the housing onto the control element 8. The width of the second slot 12, and thus the width of the key pocket 11 in the rotary housing 3 relative to the thickness of the head 151 of the key 15 causes during operation of the driving device 1 that the rotary housing 3 when rotating on the mount ring 5 which is seated immovably with regard to the cylinder insert 2 of the lock, draws the head 151 of the key 15 along and rotates the key 15 and the key blade 153 seated in engaged relation in the control element 8 of the cylinder insert 2.

In an exemplary arrangement as shown in FIG. 1, FIG. 2, FIG. 4, FIG. 5, FIG. 7, and FIG. 8, a driving device 1 which serves as a key turning device, is provided with a removable outer casing 301 in a form of an outer sleeve 302. The sleeve has a bottom 303 and is arranged slidably on the rotary housing 3 and is movable between an operative position in which the sleeve extends in overlying relation of the electrical cells and an access position in which the electrical cells are accessible and removable from engagement in the housing. The sleeve in the operative position is held attached to the rotary housing via a radial catch 304. The exemplary catch comprises a radially outwardly biased engaging projection 22 and a sleeve aperture 23. When the projection and recess are disengaged and the outer casing 301 is removed, access to the electric cells 34 is enabled for the purpose of replacement or recharging. The outer casing 301 is provided with a bottom 303 in a form of a button comprised of an elastic membrane the compliance of which responsive to manual engagement enables pressing a switch such as a microswitch 305 (shown in FIG. 2) positioned on the face of the rotary housing 3 beneath the bottom 303 of the outer casing 301, on a board 40 including circuitry constituting the electronic unit to control the driving device 1. In some exemplary arrangements the circuitry may include features of the incorporated disclosures.

Of course, in other exemplary arrangements, the driving device may be provided with an outer casing 301 with a rigid bottom 303 in which a slidable button is arranged that enables pressing a microswitch. In some arrangements the housing may include a USB socket opening 25 for charging secondary electric cells 34 that constitute the electric energy source.

As shown in FIG. 2, in the exemplary rotary housing 3 along its longitudinal axis, over the head 151 of the key 15, a pressure pad 13 is positioned, axially pressed against the key 15 by a spring 14 that on the other side abuts an inner element of the rotary housing 3. The pressure pad is capable to move along the longitudinal axis 14 of the rotary housing 3, and the function of the pressure pad is to bias the blade of the key to maintain engagement with the key cylinder 8 and eliminate play in the decoding arrangement of the cylinder insert 2.

Figure 18:
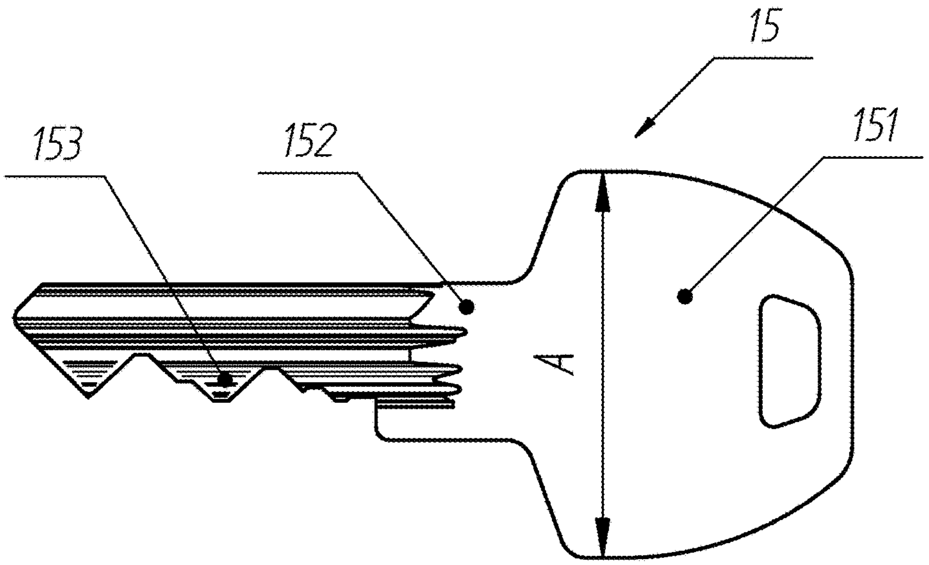
FIG. 18 shows a key for a cylinder insert.

In an exemplary arrangement as shown in FIG. 1 and FIG. 2, a lock comprises a conventional profiled cylinder insert 2 mounted for example in a mortise lock in a door leaf, wherein the cylinder lock 2 of the lock enabling access to protected areas has a body 6 in which a control element 8 of the cylinder insert 2 is rotationally seated. The control element 8 of the cylinder insert 2 may rotate within the body 6 of the cylinder insert 2, but it cannot move with regard thereto along the longitudinal axis 14 of the body 6 of the cylinder insert 2. As shown in FIG. 1 and FIG. 2, the body 6 of the exemplary cylinder insert 2 has a cylindrical part 61 in which the control element 8 of the cylinder insert 2 is rotationally movably arranged. Within the body 6 and the control element 8 of the cylinder insert 2, encoding elements of the cylinder insert 2 are arranged that cooperate with a blade of a key 15 inserted into the cylinder insert 2. The key 15 is provided with a head 151 used to be manually grasped during rotation of the key 15 within the cylinder lock 2 while manually rotating the key to a position opening the lock. As shown in FIG. 18, the key also has a blade 153 inserted into the control element 8 of the cylinder insert 2 to decode the interlocking in the cylinder insert 2, and a shoulder 152 that connects the blade 153 and the head 151. The head 151 of the key 15 has a thickness defined as the distance between its flat sides and a width defined as the distance between the furthermost radially outward points of the head 151 of the key 15 between its axially outer end and the shoulder 152 of the key 15, as shown in FIG. 18 (dimension A).

The exemplary head 151 of the key 15 used for grabbing the key 15 has a considerably greater width A than the shoulder 152 of the key 15. It is required for applying a suitable rotational torque that has to be transferred by the person manually opening (or closing) the lock onto the elements of the lock during opening (or closing) the lock by rotationally positioning the lock cylinder with a key 15. Keys for cylinder locks may be constructed such that the shoulder 152 of the key 15 is narrower than the diameter of the cylindrical part 61 of the body 6 of the cylinder insert 2 to prevent the shoulder 152 of the key 15 from interfering with the opening for the cylinder insert 2 in the shielding of the cylinder insert 2. Therefore the width of the head 151 of the key 15 is also much greater than the diameter of the cylindrical part 61 of the body 6 of the cylinder insert 2 of the lock.

Figure 9:
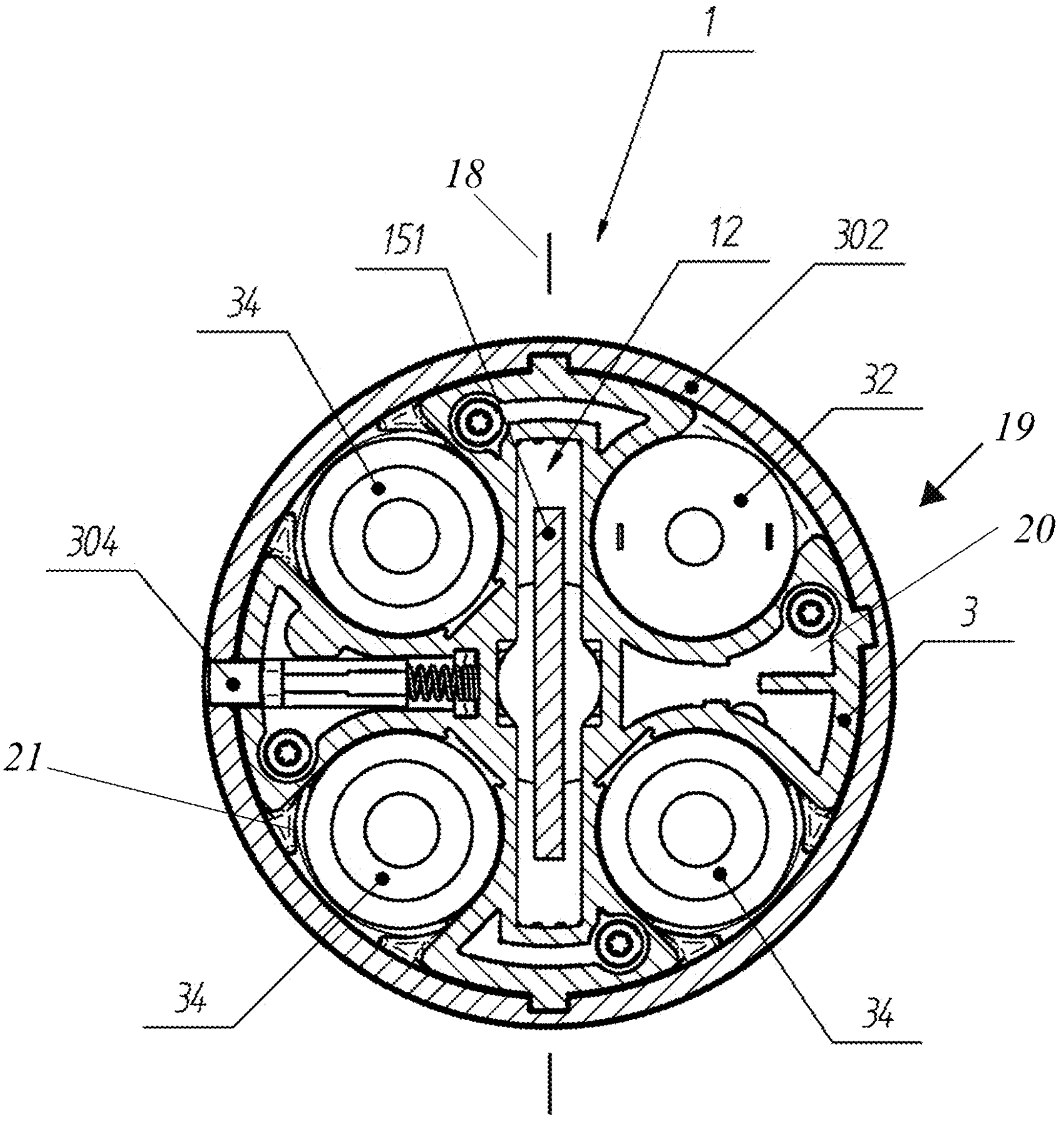
FIG. 9 shows a driving device for closing and opening a lock in another arrangement in an axially transverse cross-section.
Figure 10:
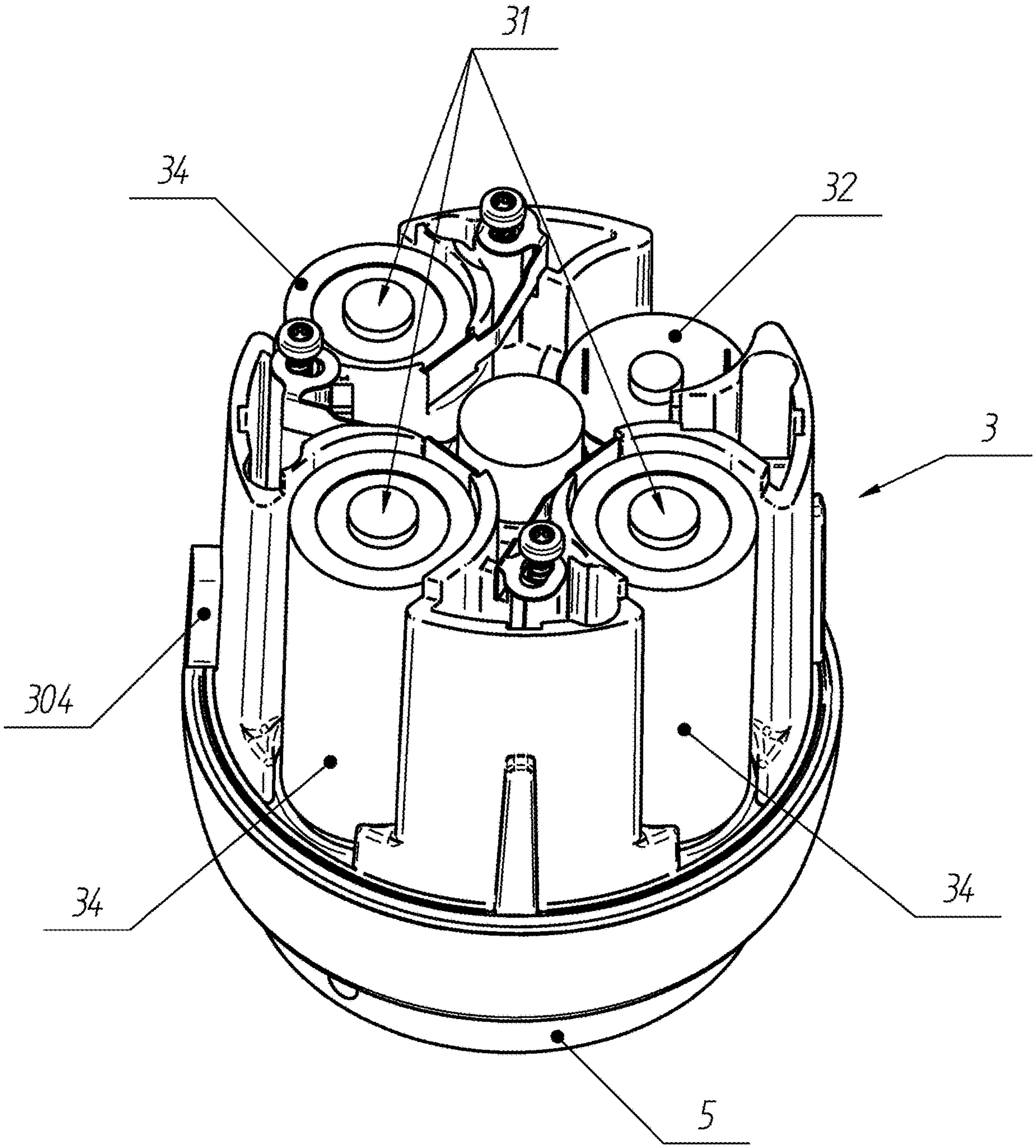
FIG. 10 shows a driving device for closing and opening a lock without a casing of the rotary housing, in a side perspective view.
Figure 11:
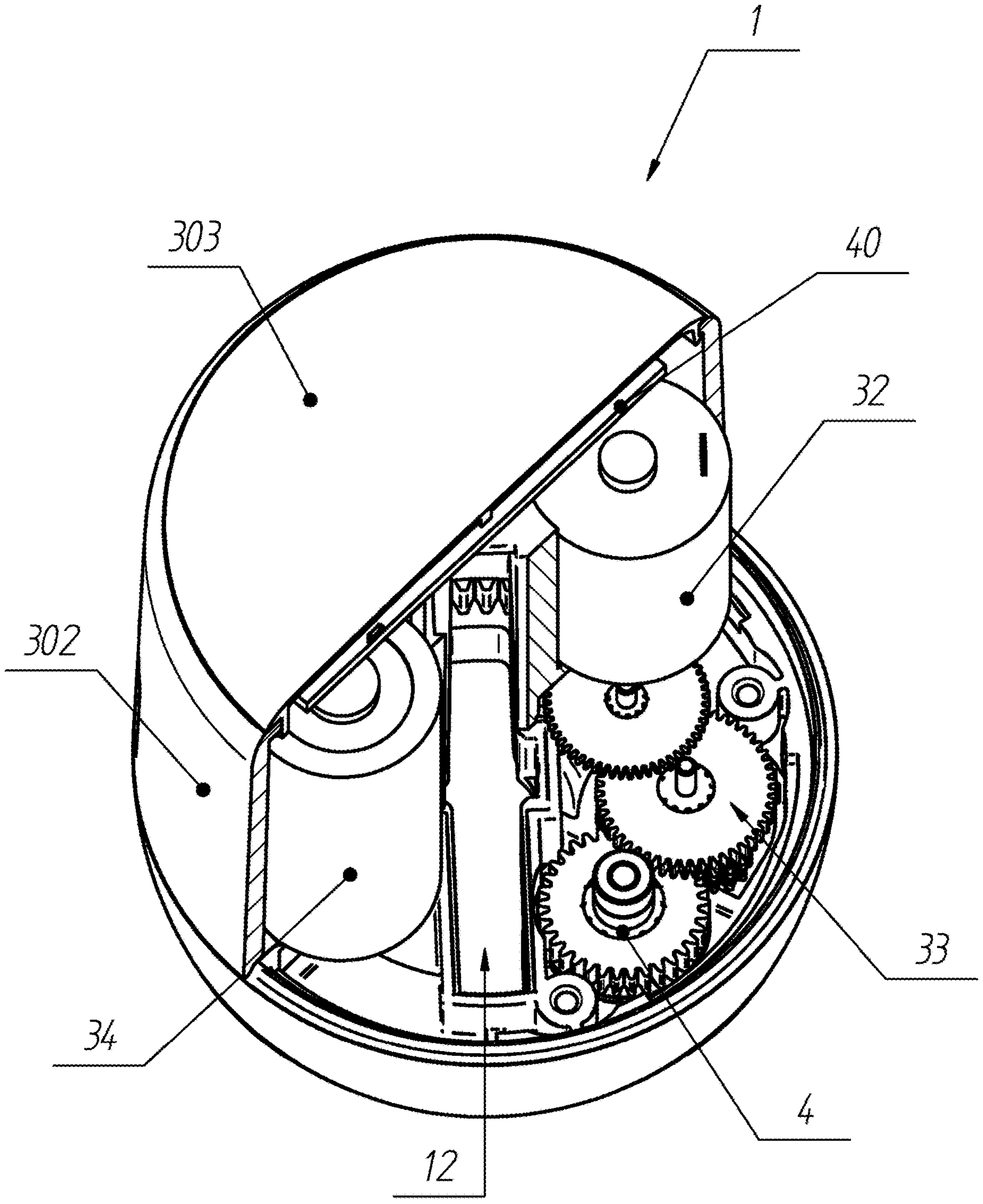
FIG. 11 shows a driving device for closing and opening a lock in a side perspective view partially in cross-section with one cell removed to illustrate the gear transmission.

As shown in FIG. 1, FIG. 2, in exemplary arrangements, a driving device 1, in particular for closing and opening of the cylinder insert 2 of the lock, and changing the lock between locked and unlocked conditions, comprises a rotary housing 3 in which a driving assembly is positioned. The driving assembly comprises, in an exemplary arrangement shown in FIG. 9, FIG. 10, and FIG. 11, electric cells 34 having a cylindrical shape, a driving motor 32 and a gear transmission 33 with a terminal toothed wheel (output gear) 4 (shown in FIG. 1), wherein the toothed wheel 4 being the terminal element of the gear transmission of the driving assembly cooperates with an arcuate gear segment of a gear ring 9 of a the mount ring 5 having radially inwardly directed gear teeth 9 (as shown in FIG. 2 FIG. 14, FIG. 15, FIG. 16, and FIG. 17). It should be understood that the exemplary gear ring comprises an arcuate gear segment which is some arrangements may be a fully circular gear segment such as gear ring 9. During rotational operation of the driving motor 32 responsive to energy delivered from the at least one electric cell, the terminal toothed wheel 4 is meshingly engaged and rolls over the teeth of the gear ring 9 of the mount ring 5. The electric energy source, as shown in FIG. 9, FIG. 10, and FIG. 11, is constituted in this arrangement by cylindrical electric cells, and these may be both primary and secondary cells.

The exemplary mount ring 5 is secured immovably with regard to the body 6 of the cylinder insert 2, as shown in FIG. 2, and the rotary housing 3 is seated in a bearing arrangement rotationally movable relative to the mount ring and axially immovable relative to the mount ring 5, wherein the rotary housing 3 comprises means for transferring the rotational driving force onto the control element 8 of the cylinder insert 2.

As it is shown in the exemplary arrangement in FIG. 2, the rotary housing 3 is seated in a bearing arrangement on the mount ring 5 so that when the driving device 1 is being mounted to the cylinder insert 2, the rotation axis 14 of the rotary housing 3 coincides with the rotation axis of the control element 8 of the cylinder insert 2.

In an exemplary arrangement as shown in FIG. 1, FIG. 12, FIG. 13, FIG. 14, FIG. 15, FIG. 16, and FIG. 17, the mount ring 5 is provided with a central opening 7 through which the rotation axis of the control element 8 extends, and the size of the central opening 7 enables free rotation of the shoulder 152 of the key 15 relative to the mount ring 5 therein during operation of the key turning device. In the exemplary arrangements shown herein the central opening has a central circular portion 26 with a round shape. However, it should be understood that in other arrangements an axially central portion may have another shape, e.g. a hexagonal shape.

Additionally, the exemplary central opening 7 in the mount ring 5 includes an axially intersecting a ring slot 10 having an elongated shape in its cross-section transverse to the rotation axis 14 of the rotary housing 3. This means that in this cross-section, the ring slot 10 has a length greater than its width. At the same time, the length of the ring slot 10 in the mount ring 5 is not smaller than the width A of the head 151 of the key 15 for the cylinder insert 2, and the width of the ring slot 10 is not smaller than the thickness of the head 151 of the key 15. This length and width of the ring slot 10 enable introduction, axially through the mount ring 5, of the head 151 of the key 15 into the key pocket 11. The exemplary arrangements shown in FIG. 1, FIG. 12, FIG. 13, FIG. 14, and FIG. 15, the ring slot 10 has a form of a rectangle with rounded corners, but it is clear that in other arrangements it may have another shape—for example the long sides may have a form of a wavy line. In exemplary arrangements it is useful for the outer dimensions of the first slot 10 to enable introduction, axially through the mount ring 5, of the head 151 of the key 15. The motor may be operated to align the key pocket slot 12 and the ring slot 10 as shown for example in FIG. 12. This enables the key turning device to be operatively engaged and disengaged from the key and the lock.

In the exemplary arrangements as shown in FIG. 1, FIG. 12, FIG. 13, FIG. 14, FIG. 15, FIG. 16, and FIG. 17, the central opening 7 of the mount ring 5 has also a function of fixing of the position of the mount ring 5 with regard to the cylindrical part 61 of the body 6 of the cylinder insert 2 of the lock so that when the mount ring 5 is mounted to the cylinder insert 2, the rotation axis 14 of the rotary housing 3 coincides the rotation axis of the control element 8. In order to position the mount ring 5 with regard to the cylindrical part 61 of the body 6 of the cylinder insert 2, the ring slot 10 so shaped so that the width of the ring slot 10 at the point where it passes through the central circular portion 26 of the central opening 7 may be smaller than the diameter of the cylindrical part 61 of the body 6 of the cylinder insert 2.

In the exemplary arrangements shown in FIG. 1, FIG. 12 FIG. 13, FIG. 14, FIG. 15, FIG. 16, and FIG. 17, the central opening 7 in the mount ring 5 has a central circular portion with a round shape, and the length of the ring slot 10 is greater than the diameter of the circular portion of the central opening 7 and the width of the ring slot 10 is smaller than the diameter of the circular portion of the central opening 7. At the same time the central opening 7 is so dimensioned that the shoulder 152 of the key 15 may move freely relative to the mount ring 5 within the central opening 7 when the rotary housing 3 with the output gear 4 is mounted to the cylinder insert 2 of the lock.

The exemplary mount ring 5 at the side of the cylinder insert 2 has a mount ring face 27 that is provided with a recess which is alternatively referred to as a radially extending face slot 28. The radially extending face slot includes walls and a bottom, and its walls, when the mount ring 5 is mounted relative to the body 6 of the cylinder insert 2 at least partially encircle a radially extending body portion 29 of the body 6 of the cylinder insert 2 so that the inner surface of the walls of the face slot engages at least partially a part of the outer surface of the terminal portion of the radially extending body portion of the body 29 to maintain the body 6 of the cylinder insert 2 and the amount ring 5 rotationally relatively immobile. Further in the exemplary arrangement the bottom of the central circular portion of the central opening 7 is defined so that the axis 14 of the rotary control element 8 of the cylinder insert 2 passes through the area of the central opening 7 and an axially adjacent cylindrical body portion 30 of the cylindrical part of the body 61 extends axially within the central circular portion 26 of the central opening 7.

Figure 13:
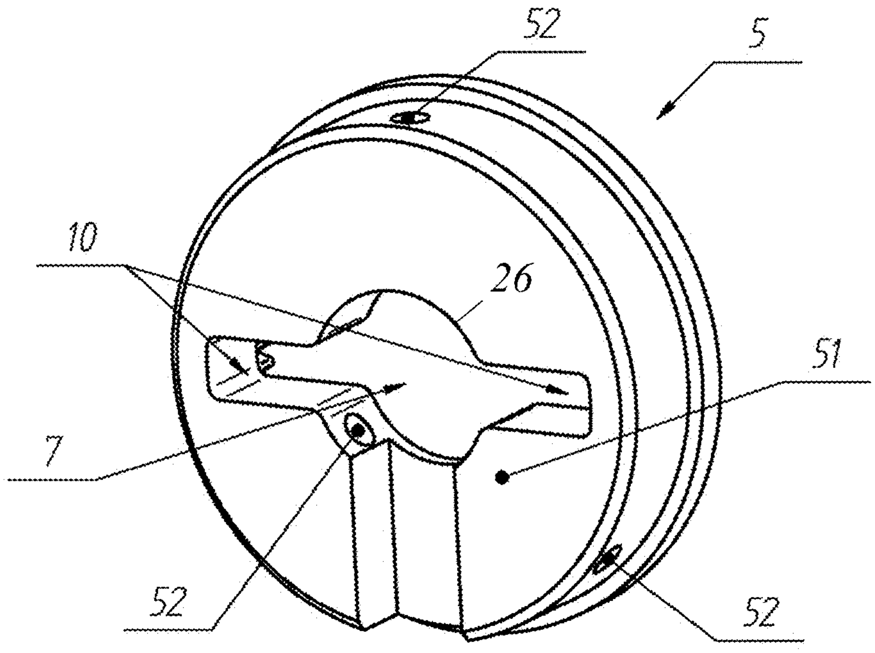
FIG. 13 shows the mount ring in a perspective view at the side of the cylinder insert.
Figure 14:
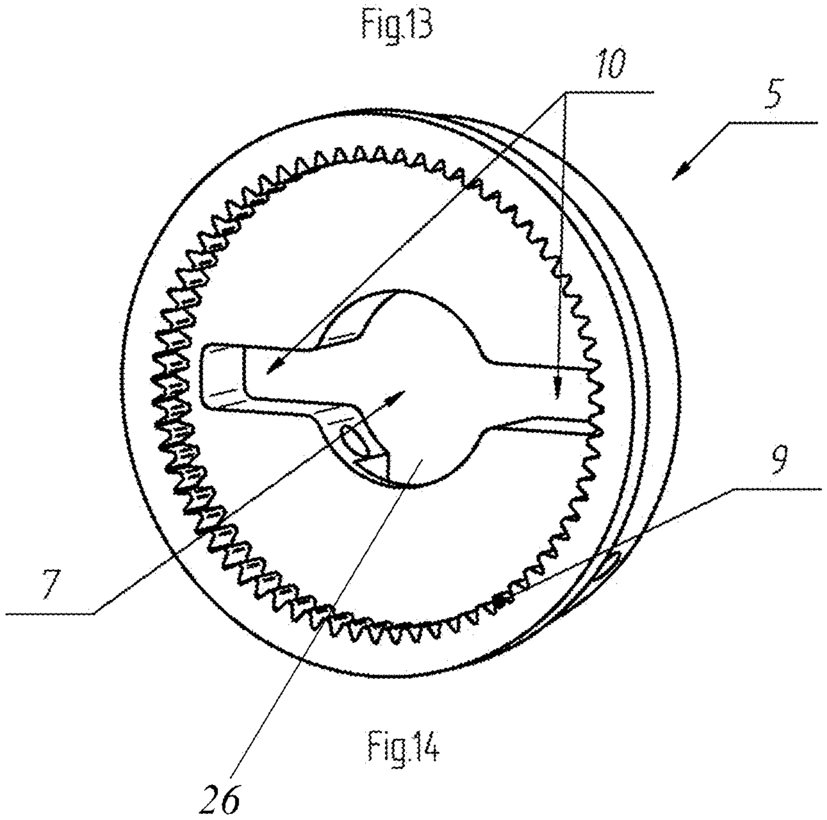
FIG. 14 shows the mount ring in a perspective view at the side of the rotary housing.
Figure 15:
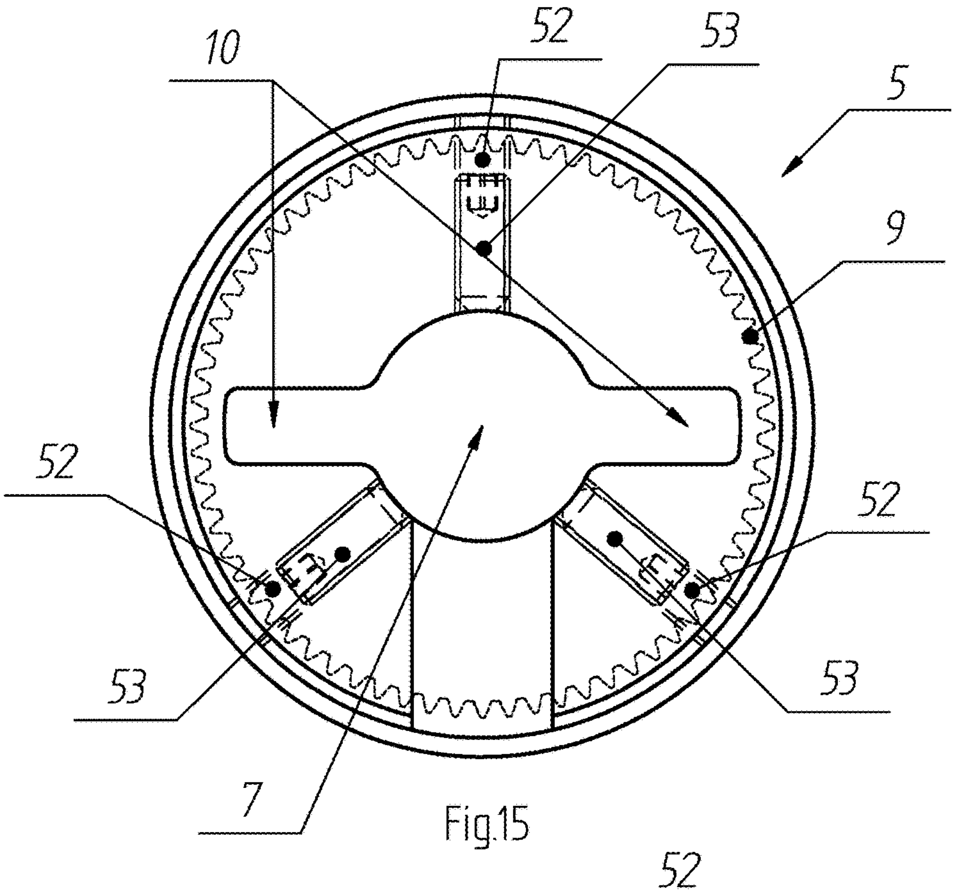
FIG. 15 shows the mount ring in a schematic view to illustrate openings and mounting screws.
Figure 16:
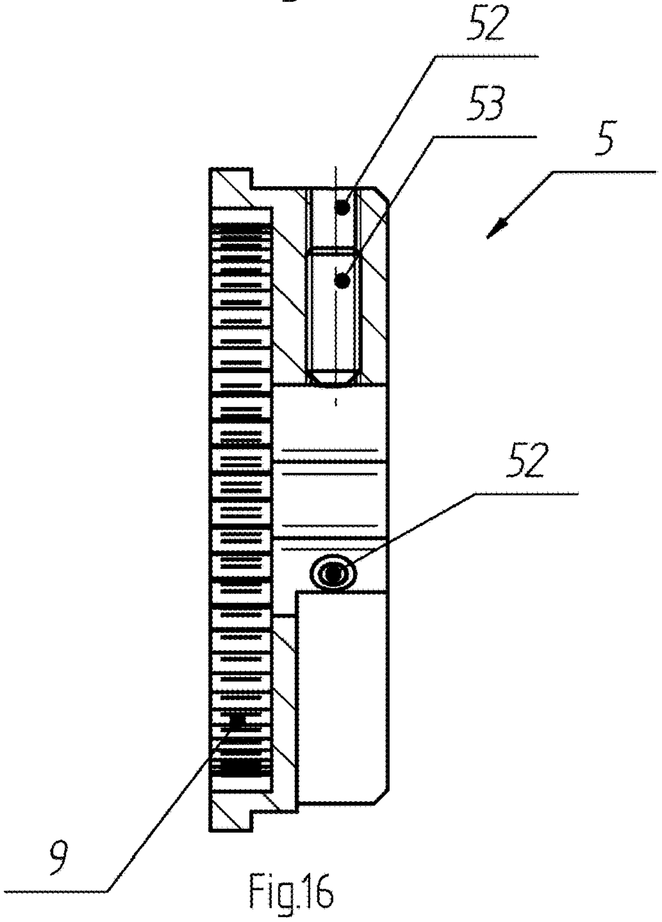
FIG. 16 shows the mount ring in a cross-section through a mounting hole.

In the exemplary arrangement as shown in FIG. 13, FIG. 15, and FIG. 16, the mount ring 5 has, at the side opposite to the housing 3, a mounting part 51 comprising three radially extending threaded mounting holes 52 in which mounting screws 53 which serve as releasable fasteners are arranged. The mounting part 51 of the mount ring 5 at least partially encircles the cylindrical body portion 30 which is the terminal part of the body 6 of the cylinder insert 2. Of course in other arrangements the number of the mounting holes 52 and the mounting screws 53 in the mount ring 5 may be different, and the manner of securing the mount ring 5 to the cylinder insert 2 of the lock or to the door leaf in which the lock is positioned may be also different. Alternatively in other arrangements different securing structures may be used.

Figure 17:
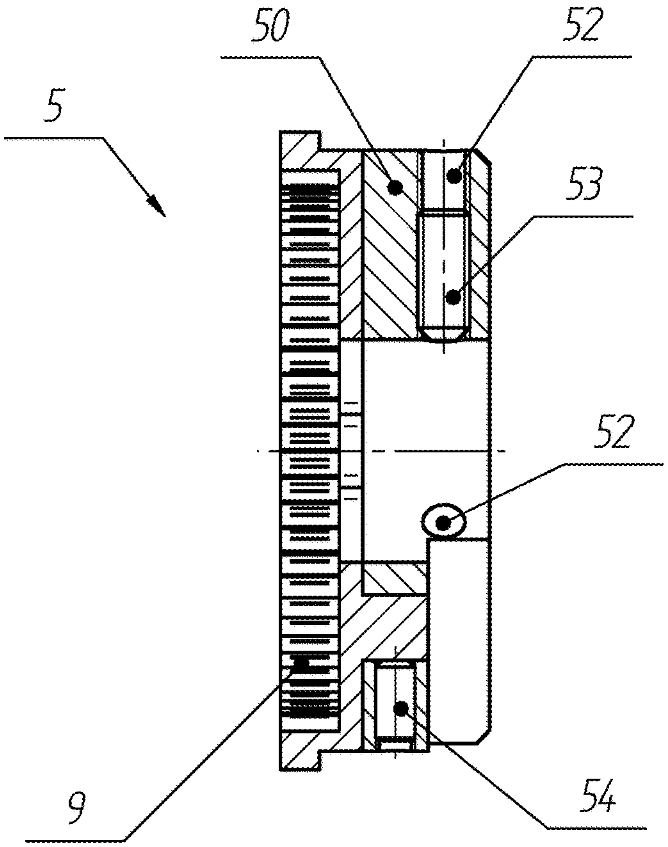
FIG. 17 shows the mount ring with a two-part construction, in a cross-section through a mounting hole.

In exemplary arrangements as shown in FIG. 17, the mount ring 5 may be two-part, and one element comprises means for immovable securing with regard to the cylinder insert 2 of the lock, while the other element comprises the gear ring 9. Both parts in this arrangement are joined with the use of the mounting screws 54.

The rotary housing 3 according to exemplary arrangements, from the side of the mount ring 5, is provided with a key pocket 11 which is constituted by a recess in the rotary housing 3, symmetrical with regard to the rotation axis 14 of the rotary housing 3 and having in its cross-section a form of an elongated key pocket slot 12 having substantially a shape of an elongated rectangle, the longitudinal axis of which extends through rotation axis 14 of the rotary housing 3. At the same time the length of the key pocket slot 12 in the rotary housing 3 is not smaller than the width A of the head 151 of the key 15 for the cylinder insert 2, and the width of the key pocket slot 12 in the rotary housing 3 is not smaller than the thickness of the head 151 of the key 15 for the cylinder insert 2. This length and width of the key pocket slot 12 determine the possibility of axially introducing the head 151 of the key 15 into the key pocket 11. At the same time, the length of the ring slot 10 and the key pocket slot 12 are greater than the diameter of the cylindrical part 61 of the body 6 of the cylinder insert 2, and thus the diameter of a circle inscribed in the central opening 7. Of course, the depth of the key pocket 11 is greater than the length of the key head 151 along with the shoulder 152 of the key 15 from its outer end of the blade 153.

Figure 12:
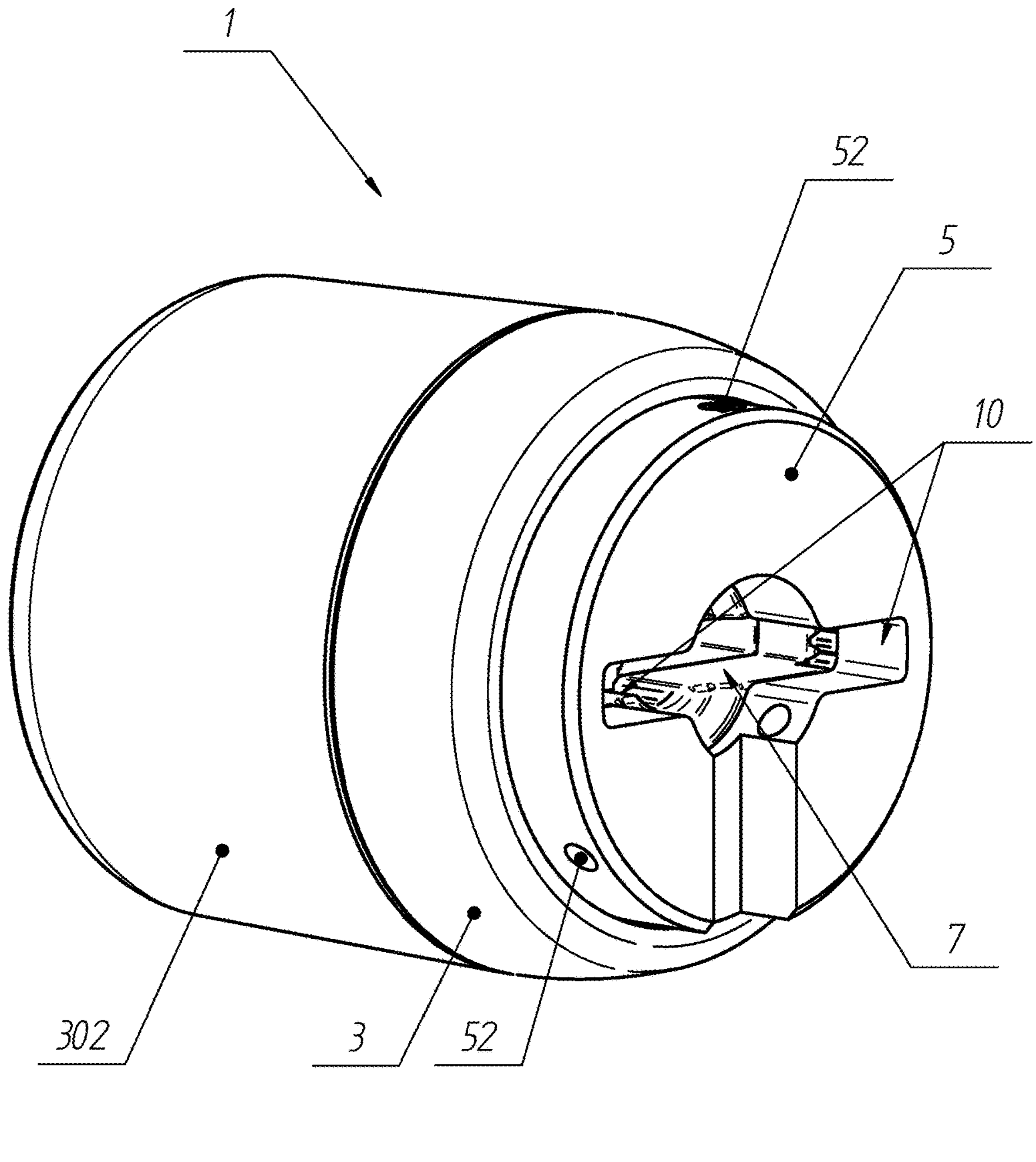
FIG. 12 shows a driving device for closing and opening a lock in a perspective view from the side of the mount ring.

The ring slot 10 in the mount ring 5 in exemplary arrangements is used when the driving device 1 is being secured to the cylinder insert 2 of the lock. During such securing it is important for the ring slot 10 in the mount ring 5 to be set in rotational alignment with key pocket 12 that defines the key pocket 11 such as is shown in FIG. 12, so that to make it possible to axially introduce the head 151 of the key 15 through the ring slot 10 into the key pocket 11. As the key is inserted the ring slot 10 and the key pocket slot 12 are aligned.

After the head 151 of the key 15 is introduced through the mount ring 5 and the driving device 1 is attached to the cylinder insert 2 of the lock, the key may rotate freely along the axis 14 with the rotary housing 3 with regard to the mount ring 5 within the central opening 7. This is achieved because the shoulder 152 of the key 15 has smaller dimensions than the diameter of the circular portion of the central opening 7, and the head 151 of the key 15 is outside the area of the mount ring 5 within the key pocket 11. As a result the central opening 7 may have a much smaller dimension than the required length of the ring slot 10, and therefore this construction in practice does not weaken the mount ring 5 while providing simple and intuitive way for mounting the driving device 1. The exemplary arrangements also enable positioning of the mount ring 5 with regard to the cylindrical part 61 of the cylinder insert 2, because due to the use of the ring slot 10, the size of the circle inscribed in the central opening 7 may correspond to the diameter of the cylindrical part 61 of the cylinder insert 2 and at the same time it can be considerably smaller than the size of the opening corresponding to the width A of the head 151 of the key 15, required for passing the head 151 of the key 15 to the other side of the mount ring 5 and into the key pocket 11 so the key may achieve rotationally immovable engagement with the housing.

In order to achieve quiet operation of the driving device 1, in exemplary arrangements the width of the key pocket slot 12 is only slightly greater than the thickness of the head 151 of the key 15 to limit idle angular movement of the rotary housing 3 with regard to the head 151 of the key 15 to render rotationally immovable engagement of the key with the housing when operation of the driving device 1 is initiated.

In the exemplary arrangement as shown in FIG. 9 and FIG. 11, a plane 18 comprising the rotation axis of the rotary housing 3 and the longitudinal axis of the key pocket slot perpendicular thereto 12 divides the internal area 19 the rotary housing 3 into two internal housing portions. A first internal housing portion 20 of the rotary housing 3, positioned at one side of the plane that divides the rotary housing 3 into two portions, a driving motor 32 and a gear transmission 33 (shown in FIG. 11) with an output gear 4 and one electric cell 34 having a cylindrical shape (shown in FIG. 9) are arranged. In the second internal housing portion 21 of the housing 3, positioned at the other side of the plane 18 that divides the internal housing area of the rotary housing into two portions, two electric cells 34 having a cylindrical shape are arranged. These two electric cells 34 in the first internal housing portion of the rotary housing 3 and one electric cell 34 in the second internal housing portion constitute an electric energy source 31.

The axis of the driving motor 32 and the axes of the cylindrical electric cells 34, constituting the electric energy source 31 for the motor and circuitry may be arranged in parallel with regard to the rotation axis 14 of the rotary housing 3 at approximately equal distances from the axis. The diameter of the body of the driving motor 32 having substantially a cylindrical shape and the diameters of the cylindrical electric cells 34 in exemplary arrangements may be approximately equal and this provides compactness of the driving device 1.

The exemplary key pocket 11 defined in the rotary housing 3 along with the key 15 inserted into the cylinder insert 2 and the head 151 of the key 15 positioned within the key pocket 11, constitute means for transferring the rotational driving force onto the control element 8. The width of the key pocket slot 12, and thus the width of the key pocket 11 in the rotary housing 3 with relation to the thickness of the head 151 of the key 15 causes that during operation of the driving device 1 the rotary housing 3 rotating on the mount ring 5 seated immovably with regard to the cylinder insert 2 of the lock, draws along the head 151 of the key 15 and rotates the shoulder 152 and the blade 153 of the key 15 seated in the control element 8 of the cylinder insert 2.

Thus the exemplary arrangements achieve improved operation, eliminate difficulties encountered in the use of prior devices and systems, and attain useful results described herein.

In the foregoing description certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the new and useful features and relationships are not limited to the exact features and relationships that have been shown and described.

It should be understood that the features and/or relationships associated with one exemplary arrangement can be combined with features and/or relationships from another exemplary arrangement. That is, various features and special relationships from various arrangements may be combined into further arrangements. The new and useful scope of the disclosure is not limited only to the exemplary arrangements that have been shown or described herein.

Having described features, discoveries and principles of the exemplary arrangements, the manner in which they are constructed and operated, and the advantages and useful results that are obtained, the new and useful features, devices, elements, arrangements, parts, combinations, systems, equipment, operations, methods, processes and relationships are set forth in the appended claims.

The invention claimed is:

1. An apparatus comprising:

a key turning device, wherein the key turning device is engageable with a key head of a key, wherein the key includes the key head, a key blade and a key shoulder that extends intermediate of the key head and the key blade, wherein the key blade is engaged in a key cylinder of a lock, wherein the key cylinder is rotatable about an axis within a body of the lock responsive to rotation of the key, and wherein the device is operative to selectively rotationally position the key and the key engaged key cylinder, such that the lock is changed between a locked condition and an unlocked condition, the key turning device including:

a mount ring, wherein the mount ring is in operatively engaged rotationally immovable connection with the body, wherein the mount ring includes an axially centered central opening, wherein the central opening is immovable relative to the mount ring and includes a central circular portion, and a rectangular ring slot, wherein the ring slot is axially centered and in overlapping relation with the central circular portion, sized to enable the key head and key shoulder to pass axially therethrough, wherein the key shoulder is rotationally movable about the axis relative to the mount ring within the central opening, an internal gear ring,
wherein the gear ring includes an arcuate gear segment that is axially centered and includes a plurality of radially inwardly directed gear teeth,
a housing, wherein the housing is
rotatably movably mounted in operative connection with the mount ring,
rotatable about the axis relative to the mount ring and is axially immovable relative to the mount ring,
wherein the housing includes
a key pocket, wherein the key pocket extends axially within the housing and is operative to hold the key head in engaged relation within the key pocket and rotationally immovable relative to the housing,
an electric motor,
a transmission, wherein the transmission
is in operative connection with the electric motor, and
includes an output gear, wherein the output gear is
selectively rotatable responsive to the motor, and
in meshing engagement with the teeth of the arcuate gear segment,
at least one electric cell, wherein the at least one electric cell is in operative connection with the motor,
wherein the motor is operative responsive to energy from the at least one electric cell to cause the key engaged lock cylinder to be rotated about the axis relative to the body of the lock and to be selectively rotatably positioned.

2. The apparatus according to claim 1,
wherein the body includes a cylindrical body portion,
wherein the cylindrical body portion extends in surrounding relation of the key cylinder and within the central circular portion of the central opening of the mount ring.

3. The apparatus according to claim 1,
wherein the body includes
a cylindrical body portion, and
a radially extending body portion,
wherein the mount ring includes a mount ring face,
wherein the central opening extends in the mount ring face,
wherein the mount ring face further includes a radially extending face slot,
wherein the cylindrical body portion extends axially within the central opening, and the radially extending body portion is engaged in the radially extending face slot such that the mount ring and the body are relatively rotationally immovable.

4. The apparatus according to claim 1,
wherein the body includes
a radially extending body portion,
wherein the mount ring includes a mount ring face,
wherein the central opening extends in the mount ring face,
wherein the mount ring face further includes a radially extending face slot,
wherein the radially extending body portion is engaged in the radially extending face slot such that the body and the mount ring are relatively rotationally immovable.

5. The apparatus according to claim 1,
wherein the body includes a cylindrical body portion,
wherein the cylindrical body portion extends within the central opening of the mount ring,
at least one releasable fastener,
wherein the at least one releasable fastener extends in the mount ring,
wherein the at least one releasable fastener is operative to hold the cylindrical body portion within the central opening.

6. The apparatus according to claim 1,
wherein the housing further includes therein:
a pressure pad, wherein the pressure pad is engaged with the key head and is operative to hold the key blade in engaged relation with the key cylinder.

7. The apparatus according to claim 1,
wherein the housing further includes therein:
a pressure pad, and
a spring, wherein the spring is in operative connection with the pressure pad,
wherein the pressure pad is engaged with the key head and the spring is operative to bias the key axially toward the key cylinder,
wherein the pressure pad is operative to hold the key blade in engaged relation with the key cylinder.

8. The apparatus according to claim 1,
wherein the arcuate gear segment of the gear ring comprises a fully circular gear segment.

9. The apparatus according to claim 1,
wherein the housing includes a removable outer sleeve,
wherein removal of the outer sleeve provides access to the at least one electric cell within the housing.

10. The apparatus according to claim 1,
wherein the at least one electric cell is removably engaged with the housing,
wherein the housing includes an outer sleeve, wherein the outer sleeve
in an operative position extends in outward overlying relation of the at least one electric cell, and
is movable away from the operative position to an access position in which the sleeve is not in outward overlying relation of the at least one electric cell,
wherein the at least one electric cell
is inaccessible from outside the housing when the outer sleeve is in the operative position, and
is accessible from outside the housing and removable from engagement with the housing when the outer sleeve is in the access position.

11. The apparatus according to claim 1,
wherein the at least one electric cell is removably engaged with the housing,
wherein the housing includes
an outer sleeve, and
a radially outwardly biased engaging projection,
wherein the outer sleeve
is axially movable relative to the at least one electric cell,
includes an aperture that extends in the outer sleeve,
in an operative position
extends in outward overlying relation of the at least one electric cell such that the at least one electric cell is not accessible from outside the housing, and
the engaging projection is engaged with the aperture to hold the outer sleeve in the operative position,
and wherein with the engaging projection disengaged from the aperture, the outer sleeve is movable away from the operative position to an access position in which the sleeve is not in outward overlying relation of the at least one electric cell, wherein in the access position the at least one electric cell is accessible from outside the housing and removable from engagement with the housing.

12. The apparatus according to claim 1, wherein the housing includes an internal area, wherein the internal area includes a first internal housing portion and a second internal housing portion, wherein the first internal housing portion extends on a first side of a plane that includes the axis and extends in centered parallel relation with the key pocket, wherein the motor and transmission are entirely within the first internal housing portion.

13. The apparatus according to claim 1, wherein the mount ring includes a radially outward extending annular projection, wherein the housing includes an axially centered annular opening, wherein the annular projection extends radially outward within the housing and axially inward of the annular opening, wherein the housing is rotationally movable about the axis relative to the mount ring with the annular projection within the housing.

14. The apparatus according to claim 1, wherein the housing includes a USB socket opening, wherein the at least one electric cell is chargeable through the USB socket opening.

15. The apparatus according to claim 1, wherein the housing includes a manually actuatable button, wherein the button is in operative connection with a switch, wherein actuation of the button is operative to cause switch actuation and motor rotation.

16. The apparatus according to claim 1, wherein with the ring slot in aligned parallel relation with the key pocket the key is removable from engagement with the key turning device.

17. The apparatus according to claim 1, wherein with the ring slot in aligned parallel relation with the key pocket the key turning device is axially movable relative to the body such that the key in engaged relation with the key cylinder, is movable so that the key head is positioned in the key pocket and the mount ring is operatively engaged in rotationally immovable relation with the body.

18. The apparatus according to claim 1, wherein the housing includes circuitry including a wireless transceiver, wherein the circuitry is in operative connection with the motor, wherein the circuitry is operative to cause the motor to rotationally move the key responsive to signals received through the wireless transceiver.

19. An apparatus comprising:

a key turning device, wherein the key turning device is releasably engageable with a key head of a key, wherein the key includes the key head, a key blade and a key shoulder that extends intermediate of the key head and the key blade, wherein the key blade is engageable in a key cylinder in operative connection with a lock, wherein the key cylinder is rotatable about an axis within a body of the lock responsive to rotation of the key, and wherein the device is operative to selectively rotatably position the key and the key engaged key cylinder, wherein the lock is changeable between a locked condition and an unlocked condition, the key turning device including:

a mount ring, wherein the mount ring is releasably engageable in rotationally immovable operative connection with the body, wherein the mount ring includes an axially centered central opening, wherein the central opening is configured to enable the key head and key shoulder to pass axially therethrough, wherein the key shoulder is rotationally movable about the axis relative to the mount ring within the central opening, an internal gear ring, wherein the gear ring includes an arcuate gear segment that is axially centered and includes a plurality of radially directed gear teeth, a housing, wherein the housing is rotatably movably mounted in operative connection with the mount ring such that the housing is rotatable about the axis and axially immovable relative to the mount ring, wherein the housing includes an internal key pocket, wherein the key pocket extends axially within the housing and is operative to accept the key head in engaged relation within the key pocket such that the key head is rotationally immovable relative to the housing, an electric motor within the housing, a transmission within the housing, wherein the transmission is in operative connection with the motor, and includes an output gear, wherein the output gear is selectively rotatable responsive to the motor, and in meshing engagement with the teeth of the arcuate gear segment, at least one electric cell within the housing, wherein the at least one electric cell is in operative connection with the motor, wherein the motor is operative responsive to energy from the at least one electric cell to cause the key engaged lock cylinder to be rotated about the axis relative to the body of the lock and to be selectively rotatably positioned.

20. The apparatus according to claim 19, wherein the central opening of the mount ring is immovable relative to the mount ring and includes a rectangular ring slot, wherein the ring slot is configured to enable the key head and key shoulder to pass axially therethrough, and a central circular portion that is axially intersected by the ring slot, wherein the body includes a cylindrical body portion, wherein the cylindrical body portion extends in surrounding relation of the key cylinder, and extends axially within the central circular portion of the central opening.

21. The apparatus according to claim 19, wherein the mount ring includes a mount ring face, wherein the mount ring face is immovable relative to the mount ring, wherein the central opening and a radially extending face slot extend in the mount ring face, wherein the body includes a radially extending body portion, wherein the radially extending body portion is engaged in the radially extending face slot such that the mount ring is rotationally immovable relative to the body.

22. The apparatus according to claim 19, wherein the housing further includes therein:
a pressure pad, wherein the pressure pad is engaged with the key head and is operative to hold the key blade in engaged relation with the key cylinder.

23. The apparatus according to claim 19, wherein the housing further includes therein:
a pressure pad, and
a spring, wherein the spring is in operative connection with the pressure pad,
wherein the pressure pad is engaged with the key head and the spring is operative to bias the key axially toward the key cylinder,
wherein the spring and pressure pad are operative to hold the key blade in engaged relation with the key cylinder.

24. The apparatus according to claim 19, wherein the at least one electric cell is removably engaged with the housing,
wherein the housing includes
an outer sleeve, and
a radially outwardly biased engaging projection,
wherein the outer sleeve
is axially movable relative to the at least one electric cell,
includes an aperture that extends on the outer sleeve,
in an operative position
extends in outwardly overlying relation of the at least one electric cell such that the at least one electric cell is not accessible from outside the housing, and
the engaging projection is engaged with the aperture to hold the outer sleeve in the operative position,
and wherein with the engaging projection disengaged from the aperture, the outer sleeve is movable away from the operative position to an access position in which the sleeve is not in outwardly overlying relation of the at least one electric cell,
wherein in the access position the at least one electric cell is accessible from outside the housing and removable from engagement with the housing.

25. An apparatus comprising:
a key turning device, wherein the key turning device is engageable with a key head of a key, wherein the key includes the key head, a key blade and a key shoulder that extends intermediate of the key head and the key blade, wherein the key blade is releasably engageable in a key cylinder of a lock,
wherein the key cylinder is rotatable about an axis within a body of the lock responsive to rotation of the key, and
wherein the key turning device is operative to selectively rotationally position the key and the key engaged key cylinder, such that the lock is changeable between each of a locked condition and an unlocked condition,
the key turning device including:
a mount ring, wherein the mount ring is adapted to be in operatively engaged rotationally immovable connection with the body,
wherein the mount ring includes
an axially centered central opening, wherein the central opening is immovable relative to the mount ring and includes
a central circular portion, and
a rectangular ring slot, wherein the ring slot
is axially centered and in overlapping relation with the central circular portion,
sized to enable the key head and key shoulder to pass axially therethrough,
wherein the key shoulder is rotationally movable about the axis relative to the mount ring within the central opening,
an internal gear ring,
wherein the gear ring includes an arcuate gear segment that is axially centered and includes a plurality of radially inwardly directed gear teeth,
a housing, wherein the housing is
rotatably movably mounted in operative connection with the mount ring,
rotatable about the axis relative to the mount ring and is axially immovable relative to the mount ring,
wherein the housing includes
a key pocket, wherein the key pocket extends axially within the housing and is adapted to releasably hold the key head in engaged relation within the key pocket and rotationally immovable relative to the housing,
an electric motor,
a transmission, wherein the transmission
is in operative connection with the electric motor, and
includes an output gear, wherein the output gear is
selectively rotatable responsive to the motor, and
in meshing engagement with the teeth of the arcuate gear segment,
at least one electric cell, wherein the at least one electric cell is in operative connection with the motor,
wherein the motor is operative responsive to energy from the at least one electric cell to cause the key that is held in the key pocket and in engagement with the lock cylinder to be rotated about the axis relative to the body of the lock and to be selectively rotatably positioned to selectively cause the lock to be in each of the locked condition and the unlocked condition.

* * * * *